（12）United States Patent
Park et al.

(10) Patent No.: US 9,367,233 B2
(45) Date of Patent: Jun. 14, 2016

(54) DISPLAY APPARATUS AND METHOD THEREOF

(71) Applicant: SAMSUNG ELECTRONICS CO., LTD., Suwon-si (KR)

(72) Inventors: In-cheol Park, Gunpo-si (KR); Min-kyu Park, Seoul (KR); Seok-yung Lee, Suwon-si (KR); Sun-tae Kim, Suwon-si (KR); Ji-hye Song, Hwaseong-si (KR); Gyeong-cheol Jang, Suwon-si (KR); Sang-beom Jo, Suwon-si (KR); Jong-keun Cho, Ansan-si (KR); Sung-kyu Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 220 days.

(21) Appl. No.: 14/140,088

(22) Filed: Dec. 24, 2013

(65) Prior Publication Data
US 2014/0123081 A1 May 1, 2014

Related U.S. Application Data

(63) Continuation-in-part of application No. 13/665,598, filed on Oct. 31, 2012.

(60) Provisional application No. 61/553,450, filed on Oct. 31, 2011.

(30) Foreign Application Priority Data

May 18, 2012 (KR) .................. 10-2012-0052814
May 13, 2013 (KR) .................. 10-2013-0053915

(51) Int. Cl.
*G06F 3/033* (2013.01)
*G06F 3/0488* (2013.01)
(Continued)

(52) U.S. Cl.
CPC ............ *G06F 3/0488* (2013.01); *G06F 3/0485* (2013.01); *G06F 3/04817* (2013.01); *G06F 3/04883* (2013.01); *G06F 21/36* (2013.01)

(58) Field of Classification Search
CPC ..................................... G06F 3/0488
USPC ........................................ 715/863
See application file for complete search history.

(56) References Cited

U.S. PATENT DOCUMENTS 8,060,840 B2    11/2011  Billow et al.
8,209,628 B1 *   6/2012  Davidson .............. G06F 3/0487
                                             715/790
(Continued)

FOREIGN PATENT DOCUMENTS

EP    2 284 674 A2     2/2011
JP    11-288347 A     10/1999
(Continued)

OTHER PUBLICATIONS

Written Opinion (PCT/ISA/237) dated Feb. 24, 2014 issued by the International Searching Authority in counterpart International Application No. PCT/KR2013/009794.
(Continued)

*Primary Examiner* — William Titcomb
(74) *Attorney, Agent, or Firm* — Sughrue Mion, PLLC

(57) ABSTRACT

A display method of a display apparatus is provided. The display method includes displaying an image on a screen, detecting a touch manipulation with respect to the image, and if the touch manipulation is detected, changing a display status of the image according to a physical attribute of the touch manipulation.

13 Claims, 48 Drawing Sheets

(51) Int. Cl.
*G06F 3/0485* (2013.01)
*G06F 3/0481* (2013.01)
*G06F 21/36* (2013.01)

(56) References Cited

U.S. PATENT DOCUMENTS

| | | | | |
|---|---|---|---|---|
| 8,760,422 | B2* | 6/2014 | Ikeda | G06F 3/041 |
| | | | | 178/18.03 |
| 8,793,606 | B2* | 7/2014 | Kim | G06F 3/04817 |
| | | | | 345/173 |
| 8,954,896 | B2* | 2/2015 | Frazier | G06F 3/044 |
| | | | | 715/862 |
| 9,047,006 | B2* | 6/2015 | Arriola | G06F 3/04812 |
| 2004/0100479 | A1 | 5/2004 | Nakano et al. | |
| 2007/0157095 | A1 | 7/2007 | Bilow et al. | |
| 2008/0168384 | A1 | 7/2008 | Platzer et al. | |
| 2008/0295037 | A1* | 11/2008 | Cao | G06F 3/0482 |
| | | | | 715/852 |
| 2010/0222049 | A1 | 9/2010 | Kim | |
| 2010/0299599 | A1 | 11/2010 | Shin et al. | |
| 2010/0321411 | A1 | 12/2010 | Paek et al. | |
| 2011/0010659 | A1 | 1/2011 | Kim et al. | |
| 2011/0029927 | A1 | 2/2011 | Lietzke et al. | |
| 2011/0035691 | A1 | 2/2011 | Kim | |
| 2011/0099492 | A1 | 4/2011 | Park et al. | |
| 2011/0201388 | A1* | 8/2011 | Langlois | G06F 3/016 |
| | | | | 455/566 |
| 2012/0023423 | A1 | 1/2012 | Bilow et al. | |
| 2012/0274662 | A1 | 11/2012 | Kim et al. | |
| 2013/0185642 | A1* | 7/2013 | Gammons | G06F 3/0482 |
| | | | | 715/733 |
| 2013/0307792 | A1* | 11/2013 | Andres | G11B 27/005 |
| | | | | 345/173 |
| 2014/0089854 | A1* | 3/2014 | Storrusten | G06F 3/0425 |
| | | | | 715/830 |

FOREIGN PATENT DOCUMENTS

| | | |
|---|---|---|
| JP | 2003-337962 A | 11/2003 |
| KR | 10-0676673 B1 | 2/2007 |
| KR | 10-2008-0078699 A | 8/2008 |
| KR | 10-2009-0049025 A | 5/2009 |
| KR | 10-2010-0027503 A | 3/2010 |
| KR | 10-2010-0124429 A | 11/2010 |
| KR | 10-2010-0136156 A | 12/2010 |
| KR | 10-2011-0006021 A | 1/2011 |
| KR | 10-2011-0014040 A | 2/2011 |
| KR | 10-2011-0045260 A | 5/2011 |
| KR | 10-1036217 B1 | 5/2011 |
| KR | 10-2011-0086501 A | 7/2011 |
| WO | 2010/134729 A2 | 11/2010 |

OTHER PUBLICATIONS

International Search Report (PCT/ISA/210) dated Feb. 24, 2014 issued by the International Searching Authority in counterpart International Application No. PCT/KR2013/009794.

* cited by examiner

DISPLAY APPARATUS AND METHOD THEREOF

CROSS-REFERENCE TO RELATED APPLICATIONS

This is a continuation-in-part of prior U.S. application Ser. No. 13/665,598, filed on Oct. 31, 2012, now pending, of which benefit is claimed under 35 U.S.C. §120. This application also is related to, and claims priority from U.S. Provisional Patent Application No. 61/553,450, filed on Oct. 31, 2011, in the United States Patent and Trademark Office, and Korean Patent Application Nos. 10-2012-0052814, filed on May 18, 2012, and 10-2013-0053915, filed on May 13, 2013, in the Korean Intellectual Property Office, the disclosures of which are incorporated herein by reference in their entirety.

BACKGROUND

1. Field

Apparatuses and methods consistent with exemplary embodiments relate to displaying, and more particularly, to a display apparatus and a method thereof which express corresponding physical interaction in response to a touch input made by a user.

2. Description of the Related Art

Various types of display apparatuses are developed and distributed according to advancement of electronic technology. Mobile display apparatus such as mobile phones, PDAs, tablet PCs, or MP3 players are representative examples of the electronic apparatuses.

The display apparatuses provide interactive screens of various configurations. For example, a display apparatus may display a background screen which contains various icons to execute applications installed on the display apparatus. A user generally executes a corresponding application by touching on an icon displayed on the background screen.

However, as display apparatuses are provided in varying models and performances, and also as various types of applications are provided in increasing numbers, the existing standardized ways of inputting instructions do not meet user satisfaction.

Accordingly, an interactive screen configuration, which is more fun and more dynamic, is necessary.

SUMMARY

Exemplary embodiments overcome the above disadvantages and other disadvantages not described above. Also, the exemplary embodiments are not required to overcome the disadvantages described above, and an exemplary embodiment may not overcome any of the problems described above.

According to one exemplary embodiment, a technical objective is to provide a display apparatus and a method thereof which represent physical interaction in response to a touch input of a user.

In one exemplary embodiment, a display method of an apparatus is provided, which may comprise: displaying an image on a screen; detecting a touch manipulation with respect to the image; and if the touch manipulation is detected, changing a display status of the image according to a physical attribute of the touch manipulation.

The physical attribute may comprise at least one from among intensity, momentum, velocity, and force.

The touch manipulation may comprise one from among a flick manipulation and a touch-and-drag manipulation.

Whether the flick manipulation occurs may be determined based on a distance between a touch start point and a touch release point, and a time between an initial touch and release of the touch manipulation.

In another exemplary embodiment, a display method of an apparatus is provided, which may comprise: displaying a plurality of areas on a screen; detecting a touch manipulation in one direction of the screen; and reducing a size of at least one of the plurality of areas in the one direction and expanding a size of at least one of the plurality of areas in a direction opposite to the one direction.

The reducing and expanding may occur substantially simultaneously.

When the touch manipulation ends, the plurality of areas may return to their original size.

A velocity of recovery of the plurality of areas to their original size may be based on a strength of the touch manipulation.

If the touch manipulation is made at a last page, at least an oscillation effect on the screen may be initiated.

In another exemplary embodiment, a display method of an apparatus is provided, which may comprise: displaying a plurality of areas on a screen; detecting a touch manipulation in one direction of the screen; and adjusting at least one from among a shape, a size, and a boundary of only areas in close proximity to where the touch manipulation occurs.

In another exemplary embodiment, a display method of a display apparatus is provided, which may comprise: displaying a plurality of areas on a screen; detecting a touch manipulation on the screen; and determining a size of an area affected by the touch manipulation based on an intensity of the touch manipulation.

The size of the area may get larger as the intensity of the touch manipulation increases.

In another exemplary embodiment, a display apparatus is provided, which may comprise: a display configured to display an image on a screen; a detector configured to detect a touch manipulation with respect to the image; a controller which, if the touch manipulation is detected, is configured to change a display status of the image according to a physical attribute of the touch manipulation.

In another exemplary embodiment, a display apparatus is provided, which may comprise: a display configured to display a plurality of areas on a screen; a detector configured to detect a touch manipulation in one direction of the screen; and a controller which, if the touch manipulation is detected, is configured to reduce a size of at least one of the plurality of areas in the one direction and expand a size of at least one of the plurality of areas in a direction opposite to the one direction.

In another exemplary embodiment, a display apparatus is provided, which may comprise: a display configured to display a plurality of areas on a screen; a detector configured to detect a touch manipulation in one direction of the screen; and a controller which, if the touch manipulation is detected, is configured to adjust at least one from among a shape, a size, and a boundary of only areas in close proximity to where the touch manipulation occurs.

In another exemplary embodiment, a display apparatus is provided, which may comprise: a display configured to display a plurality of areas on a screen; and a detector configured to detect a touch manipulation on the screen, wherein a size of an area affected by the touch manipulation is determined by an intensity of the touch manipulation.

In various exemplary embodiments, the user satisfaction increases as he or she controls the operation of the display apparatus through the interaction image.

BRIEF DESCRIPTION OF THE DRAWINGS

The above and/or other aspects of exemplary embodiments will be more apparent with reference to the accompanying drawings, in which.

DETAILED DESCRIPTION OF EXEMPLARY EMBODIMENTS

Figure 1:
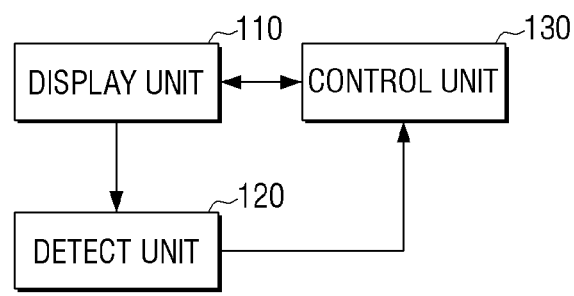
FIG. 1 is a block diagram of a display apparatus according to an exemplary embodiment.

Certain exemplary embodiments will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Accordingly, it is apparent that the exemplary embodiments can be carried out without those specifically defined matters. Also, well-known functions or constructions are not described in detail since they would obscure the invention with unnecessary detail.

FIG. 1 is a block diagram of a display apparatus according to an exemplary embodiment. Referring to FIG. 1, the display apparatus 100 may include a display unit 110, a detecting unit 120 and a control unit 130.

The display unit 110 may display an interaction image on a screen.

As used herein, the 'interaction image' may refer to at least one object on a screen, through which a user may input various interaction signals to use the display apparatus 100. The object may include an application icon, a file icon, a folder icon, a content icon, a widget window, an image, a text or various other marks. An example of the interaction image may include a background image on which icons representing various contents are displayed, a locked image displayed on a screen in locked state, a screen generated in response to executing a specific function or application, or a screen generated with playback of the content.

The detecting unit 120 may detect a user's manipulation with respect to the interaction image. By way of example, the detecting unit 120 may provide the control unit 130 with coordinate values of a point touched by the user on the interaction image.

The control unit 130 may determine a variety of touch attributes including location, number, moving direction, moving velocity or distance of point of touch. The control unit 130 may then determine the type of touch input based on the touch characteristics. To be specific, the control unit 130 may determine if the user simply touches on the screen, or touches-and-drags, or clicks on the screen. Further, based on the number of point of touches, the control unit 130 may determine if the user touches on a plurality of points using a plurality of objects such as fingertips or touch pens.

If detecting a touch input, the control unit 130 may change the display state of the interaction image to express physical interaction of the object on the interaction image in response to the touch input. As used herein, the 'physical interaction' may refer to a reaction of the object to a force exerted on the object touched by the user in response to the touch input.

That is, the control unit 130 may change the interaction image to express a corresponding reaction made in response to a variety of touch input attributes such as intensity, direction, or velocity of touching, or direction of dragging, direction of flicking, or form of touching, or the like, in the form of shaking, expanding or reducing, bending, pushing away from original position and then returning, or leaving away from original location in a direction of force exerted and dropping to another location, or the like. The physical interaction will be explained in greater detail below with reference to examples.

The control unit 130 may change the interaction image regarding the type of the object touched by the user or touch attributes, and perform an operation according to the touch input. To be specific, the control unit 130 may perform various operations including turning pages, executing an application corresponding to an object, opening a file or folder corresponding to an object, executing content corresponding to an object, editing an object, unlocking, or the like. The operation performed at the control unit 130 will be explained in greater detail below with reference to examples.

The display apparatus 100 of FIG. 1 may be implemented in various configurations for displaying, which may include, for example, a TV, mobile phone, PDA, laptop computer, tablet PC, PC, smart monitor, electronic frame, electronic book, or MP3 player. The detailed constitution of the display apparatus 100 may vary depending on exemplary embodiments.

Figure 2:
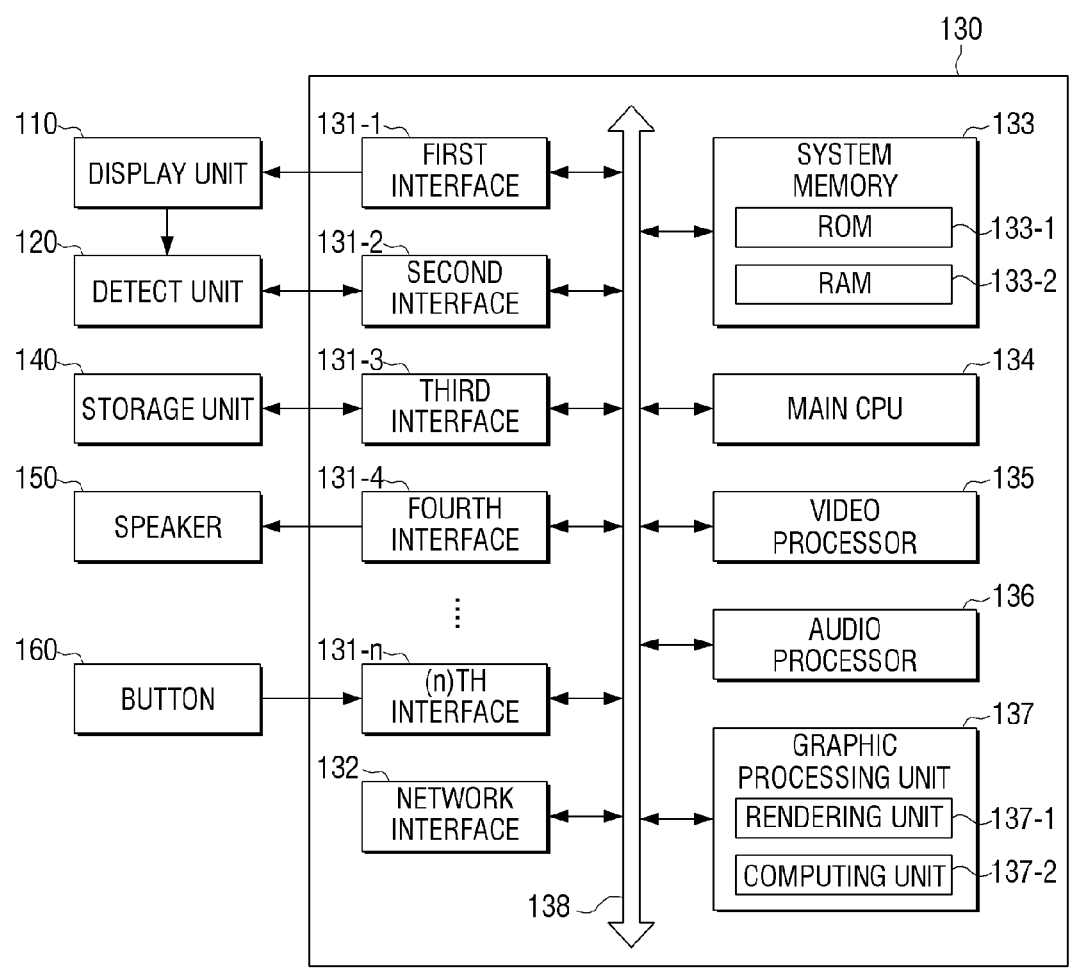
FIG. 2 is a block diagram provided to explain a general constitution of a display apparatus according to an exemplary embodiment.

FIG. 2 is a block diagram provided to explain constitution of the display apparatus 100 according to various exemplary embodiments.

Referring to FIG. 2, the display apparatus 100 may include a display unit 110, a detecting unit 120, a control unit 130, a storage unit 140, a speaker 150, or a button 160.

As explained above, the display unit 11 may display various types of interaction images. Depending on the type of the display apparatus 100, the display unit 110 may be implemented in various forms. By way of example, when adapted for use in a liquid crystal display (LCD) display apparatus, the display unit 110 may include a display panel and a backlight unit. The display panel may include a substrate, a driving layer, a liquid crystal layer, and a protective layer to protect the liquid crystal layer. The liquid crystal layer may include a plurality of liquid crystal cells (LCC). The driving layer may be formed on the substrate and drive the respective LCC. To be specific, the driving layer may include a plurality of transistors. The control unit 130 may apply an electric signal to a gate of each transistor to turn on the LCC connected to the transistor. Accordingly, an image is displayed. Meanwhile, if implemented in the form of an organic light emitting diode, the display unit 110 may not include the backlight unit. Although the display unit 110 may utilize a planar display panel in one exemplary embodiment, in another exemplary embodiment, the display unit 110 may be implemented in the form of transparent display or flexible display. If implemented as a transparent display, the display unit 110 may include a transparent substrate, a transistor made instead by using transparent material such as transparent zinc oxide layer or titanium oxide, a transparent electrode such as indium tin oxide (ITO), or a transparent organic light emitting layer. If implemented in the form of a flexible display, the display unit 110 may include a plastic substrate such as polymer film, a driving layer including organic light emitting diode and a flexible transistor such as a Thin Film Transistor (TFT), low temperature poly silicon (LTPS) TFT, organic TFT (OTFT), and a protective layer of flexible material such as $ZrO$, $CeO_2$, or $ThO_2$.

The detecting unit 120 may detect touch inputs made by the user with respect to the surface of the display unit 110. By way of example, the detecting unit 120 may detect the touch input using a touch sensor provided inside the display unit 110. The touch sensor may be capacitive or resistive. A capacitive touch sensor may detect micro-electricity conducted by a body of the user who touches on the surface of the display unit, by using a dielectric material coated on the surface of the display unit 110 and thus calculate touch coordinates. The resistive touch sensor may include two electrode plates installed within the display unit 110 which are brought into contact at a point of touch to detect electric current when the user touches the screen, and thus calculate touch coordinates. The detecting unit 120 may detect the coordinates of the point of touch through the touch sensor and provide the detected result to the control unit 130.

The detecting unit 130 may include various additional sensors such as an acoustic sensor, a motion sensor, an access sensor, a gravity sensor, a GPS sensor, an acceleration sensor, an electromagnetic sensor, a gyro sensor, or the like. Accordingly, the user may control the display apparatus 100 by rotating or shaking the display apparatus 100, articulating a predetermined verbal command, gesturing a preset motion, accessing a hand close toward the display apparatus 100, as well as touching the display apparatus 100.

By way of example, if the access sensor or illuminance sensor is used, the detecting unit 120 may detect a location accessed by the user by using the access sensor, and provide the detected result to the control unit 130. The control unit 130 may perform operations corresponding to a menu displayed on the location accessed by the user.

In another example, if the motion sensor is used, the detecting unit 120 may perceive motion of the user and provide the control unit 130 with the result of perception. The control unit 130 may perform operations corresponding to the user's motion based on the result of perception.

Additionally, if the electromagnetic sensor, the acceleration sensor, the gyro sensor, or the GPS sensor is used, the detecting unit 120 may detect movement, rotation, or tilting of the display apparatus 100 using a corresponding sensor, and provide the control unit 130 with the detected result. The control unit 130 may perform operations corresponding to the detection made at the detecting unit 120. For example, if change in pitch, roll and yaw angles is detected with respect to the display surface of the display apparatus 100, the control unit 130 may switch the screen by page units according to direction and degree of such change, or switch the screen in a horizontal or vertical direction and display the result.

The storage unit 140 may store therein various programs or data associated with the operation of the display apparatus 100, setting data set by the user, system operating software, various application programs, or information regarding the user's manipulation.

The control unit 130 may perform various operations using various software stored at the storage unit 140.

The speaker 150 may output audio signal processed at the display apparatus 100, and the buttons 160 may be implemented in forms such as mechanic buttons, touch pad, or a wheel formed on a predetermined area of a front, side or rear portion of the outer portion of the main body of the display apparatus 100.

Meanwhile, referring to FIG. 2, the control unit 130 may include first to (n)th interfaces 131-1 to 131-n, a network interface 132, a system memory 133, a main CPU 134, a video processor 135, an audio processor 136, a graphic processing unit 137 and a bus 138.

The respective components may be connected to each other via the bus 138 and transmit or receive various data or signals.

The first to (n)th interfaces 131-1 to 131-n may be connected to components such as the display unit 110, the detecting unit 120, the storage unit 140, the speaker 150, or the buttons 160. Although not illustrated in FIG. 2, as an alternative to the buttons 160, interface connected to various input means such as keyboard, mouse, joystick, or the like may be provided.

The network interface 132 may be connected to external devices through a network.

Among the above-mentioned interfaces, the main CPU 134 may access the storage unit 140 via the third interface 131-3, and perform booting by using the O/S stored at the storage unit 140. The main CPU 134 may perform various operations using various programs, contents, or data stored at the storage unit 140.

To be specific, the system memory 133 may include a ROM 133-1 and a RAM 133-2. The ROM 133-1 may store a command set for system booting. With the supply of electricity in response to a turn-on command, the main CPU 134 may copy the O/S stored at the storage unit 150 to the RAM 133-2 according to the command stored at the ROM 133-1 and boot the system by executing the O/S. When the booting is completed, the main CPU 134 may copy the various application programs stored at the storage unit 140 to the RAM 133-2 and perform various operations by executing the copied application programs.

The graphic processing unit 137 may construct various forms of interaction images according to control of the main CPU 134.

The graphic processing unit 137 may include a rendering unit 137-1 and a computing unit 137-2. The computing unit 137-2 may calculate the display state value with respect to the interaction image by taking into consideration the attributes of an object displayed on the interaction image, and physical attributes defined with respect to the interaction image. The 'display state value' may include attribute values such as coordinates of a location at which the object is to be displayed on the interaction image, or form, size or color of the object.

The rendering unit 137-1 may generate the interaction image according to the display state value calculated at the computing unit 137-2. The interaction image generated at the graphic processing unit 137 may be provided to the display unit 110 via the first interface unit 131-1 and displayed. Although the rendering unit 137-1 and the computing unit 137-2 are illustrated in FIG. 2, in another exemplary embodiment, these components may be named as a rendering engine and a physics engine.

As explained above, the interaction image may include various forms of images including background image, locking image, application executing image, or content playback image. That is, the main CPU 134 may control the graphic processing unit 137 to generate an interaction image to suit circumstances.

If the user selects an object displayed on the interaction image, the main CPU 134 may perform an operation corresponding to the selected object. By way of example, if one multimedia content is selected from the interaction image including multimedia content, the main CPU 134 may control the video processor 135 and the audio processor 136 to playback the multimedia.

The video processor 135 may include a video decoder, a renderer, and a scaler. Accordingly, the video processor 135 may decode video data within the multimedia content, perform rendering with respect to the decoded video data to construct frames, and scale a size of the constructed frames to suit the information display area.

The audio processor 136 may include an audio decoder, a noise filter, or an amplifier. Accordingly, the audio processor 136 may perform audio signal processing such as decoding, filtering or amplification of the audio data contained in the multimedia content.

Meanwhile, if a user manipulation is inputted with respect to the interaction image, the main CPU 134 may change the display state of the interaction image to express physical interaction in response to the user manipulation. To be specific, the main CPU 134 may control the computing unit 137-2 to compute a display state change value to display the physical interaction exerted on the interaction image according to the user manipulation as detected. The computing unit 137-2 may compute change values of the attributes such as coordinates of a moved location with respect to the display coordinates of an object, distance of moved location, direction of movement, velocity of movement, shape of the object, size or color. In such process, changes due to collision between objects may also be considered. The main CPU 134 may control the rendering unit 137-1 to generate an interaction image according to the display state change value computed at the computing unit 137-2 and control the display unit 110 to display the generated interaction image.

Accordingly, since the physical interaction in response to the user's touch input is expressed directly on the screen, various operations may be performed.

Figure 3:
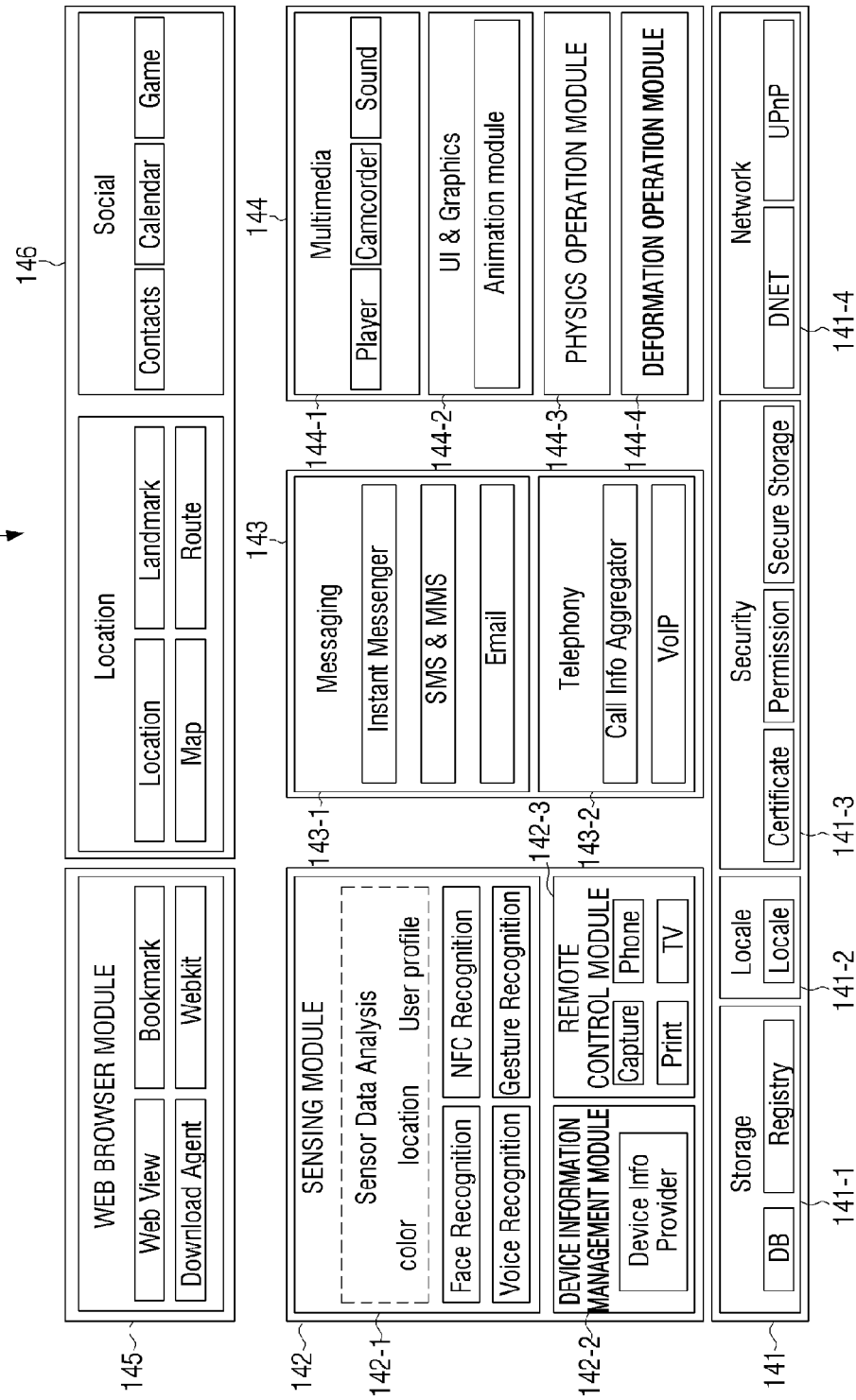
FIG. 3 is a hierarchy chart of a software applicable for a display apparatus according to an exemplary embodiment.
Figure 4:
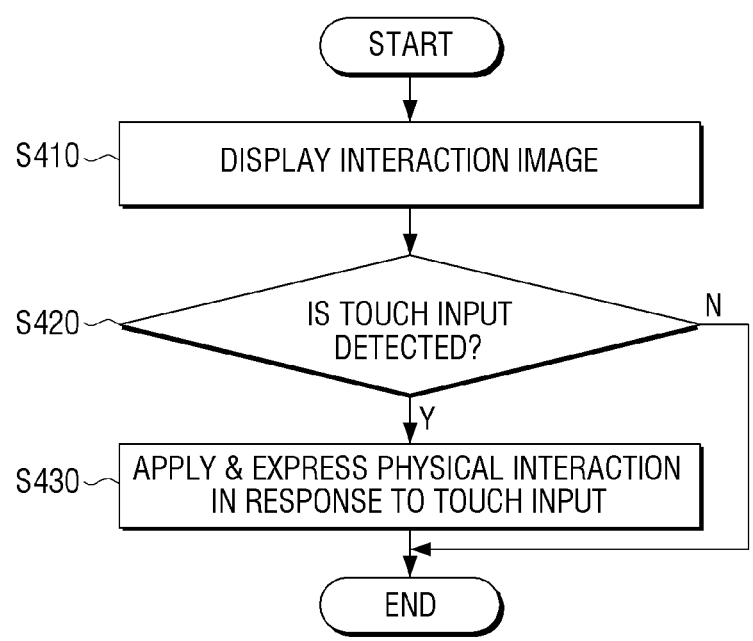
FIG. 4 is a flowchart provided to explain a display method according to an exemplary embodiment.

FIG. 3 is a view provided to explain a hierarchical layer of the software stored at the storage unit 140. Referring to FIG. 4, the storage unit 140 may include a base module 141, a device management module 142, a communication module 143, a presentation module 144, a web browser module 145, and a service module 146.

The base module 141 may process the signals transmitted from the respective hardware of the display apparatus 100 and transmit the processed signals to the upper-layer module.

The base module 141 may include a storage module 141-1, a position-based module 141-2, a security module 141-3, and a network module 141-4.

The storage module 141-1 may be a program module provided to manage a database (DB) or registry. The main CPU 134 may access the database within the storage unit 140 using the storage module 141-1 and read various data. The position-based module 141-2 may refer to a program module that supports position-based service in association with various hardware such as GPS chip, or the like. The security module 141-3 may refer to a program module that supports certification of hardware, request permission, secure storage, or the like, and the network module 141-4 may support the network connection and include a DNET module, or a universal plug-and-play (UPnP) module.

The device management module 142 may manage information regarding external input and external devices, and utilize the same. The device management module 142 may include a sensing module 142-1, a device information management module 142-2, and a remote control module 142-3. The sensing module 142-1 may analyze the sensor data provided from the respective sensors inside the detecting unit 120. To be specific, the sensing module 142-1 may be implemented as a program module to operate to detect manipulation attributes such as coordinates of a point of touch, direction where touch is moving, velocity or distance of movement. Depending on occasions, the sensing module 142-1 may include a facial recognition module, a voice recognition module, a motion recognition module, or a near field communication (NFC) recognition module. The device information management module 142-2 may provide information about respective devices, and the remote control module 142-3 may perform operations to remotely-control peripheral devices such as a telephone, TV, printer, camera, or air conditioner.

The communication module 143 may be provided to perform external communication. The communication module 143 may include a messaging module 143-1 such as a messenger program, a SMS (Short Message Service) & MMS (Multimedia Message Service) program, an email program, or a telephone module 143-2 including a Call Info Aggregator program module, or a voice over Internet protocol (VoIP) module.

The presentation module 144 may be provided to construct a display screen. The presentation module 144 may include a multimedia module 144-1 to playback and output multimedia content, a user interface (UI) & graphic module 144-2 to process a UI and graphics, a physics operation module 144-3, and a deformation operation module 144-4.

The multimedia module 144-1 may include a player module, a camcorder module, or a sound processing module.

Accordingly, various multimedia contents are played back to perform operations to generate and play back images and sound.

The physics operation module 144-3 is a module which calculates physical attributes such as intensity, momentum, velocity, elastic force, etc. based on an input parameter according to a user's touch manipulation. That is, when a user inputs a flick manipulation in which the user turns pages fast while touching one point on a screen, or when a user inputs a touch-and-drag manipulation, a distance between a point where the first touch is input and a point where the last touch is input may be calculated. The physics operation module 144-3 may calculate physical attributes such as intensity, momentum, velocity, elastic force, etc. which are applied to a screen or an object on the screen using the distance between the touch points and the time required for the touch manipulations.

The deformation operation module 144-4 is a module for calculating a deformation rate value corresponding to the physical attributes calculated by the physics operation module 144-3. That is, when strength as much as 'a' is applied to a screen or an object, a deformation rate value is calculated so that the display status of the corresponding screen or object may be deformed at a rate which is proportional to 'a'. The calculated deformation rate is provided to an animation module in the UI & graphic module 144-2.

The UI & graphic module 144-2 may include an image compositor module to combine images, an X11 module to receive various events from the hardware, and coordinate combining modules to combine and generate coordinates on the screen on which an image is to be displayed, a 2D/3D UI tool kit to provide tools to construct a 2D or 3D UI, and an animation module to represent an animation effect. The animation module performs screen interpolation and animation processing according to the deformation rate value provided by the deformation operation module 144-4. The graphic processing unit 137 may display various types of UIs using the animation module of the UI & graphic module 144-2, and change a UI display status according to a user interaction as described below.

The web browser module 145 may access a web server by performing web browsing. The web browser module 145 may include various modules such as a web view module to construct a web page, a download agent module to perform downloading, a bookmark module, a Webkit module, or the like.

The service module 146 may refer to an application module to provide various services. By way of example, the service module 146 may include a navigation service module to provide a map, current location, landmark, or route information, a game module, an ad application module, or the like.

The main CPU 134 within the control unit 130 may access the storage unit 140 via the third interface 131-3 to copy various modules stored at the storage unit 140 to the RAM 133-2 and perform operations according to the operation of the copied module.

Referring to FIG. 3, the base module 141, the device information management module 142-2, the remote control module 142-3, the communication module 143, the multimedia module 144-1, the web browser module 145, and the service module 146 may be usable depending on the types of the object selected by the user on the interaction image. By way of example, if the interaction image is a background image and if the user selects a telephone menu, the main CPU 134 may connect to a correspondent node by executing the communication module 143. If an Internet menu is selected, the main CPU 134 may access a web server by executing the web browser module 145 and receiving webpage data. The main CPU 134 may execute the UI & graphic module 144-2 to display the webpage. Further, the above-mentioned program modules may be adequately used to perform various operations including remote controlling, message transmission and reception, content processing, video recording, audio recording, or application executing.

The program modules illustrated in FIG. 3 may be partially omitted, modified or added depending on the types and characteristics of the display apparatus 100. That is, if the TV is implemented as the display apparatus 100, broadcast reception module may additionally be included. The service module 146 may additionally include an electronic book application, a game application and other utility programs. Further, if the display apparatus 100 does not support Internet or communication function, the web browser module 145 or the communication module 143 may be omitted.

The components illustrated in FIG. 2 may also be omitted, modified or added, depending on the types and characteristics of the display apparatus 100. For example, if a TV is implemented as the display apparatus 100, hardware such as antenna or tuner may be additionally included.

Meanwhile, the main CPU 134 may enable the user to switch the interaction image to another or edit an object on the interaction image, by variously changing the interaction image according to the user manipulation. The editing may include moving a displayed object, enlarging a size of object, deleting an object, copying, or changing color and shape of an object.

To be specific, the main CPU 134 may analyze the detection at the detecting unit 120 using the sensing module 142-1 to determine a characteristic of the touch input made by the user. Accordingly, if it is determined that a touch input is made with respect to a specific object on the interaction image, the main CPU may execute the UI & graphic module 144-2 to provide various base data to the graphic processing unit 137 to change the display state of the interaction image. The 'base data' may include screen size, screen resolution, screen attributes, or coordinate values of a spot at which the object is displayed. Accordingly, and as explained above, the graphic processing unit 137 may generate an interaction image to express a physical interaction in response to the touch input and provide the generated image to the display unit 110.

FIG. 4 is a flowchart provided to explain a display method implemented at the display apparatus 100 of FIG. 1.

Referring to FIG. 4, at S410, the display apparatus 100 may display an interaction image. The interaction image may be implemented in various types and shapes. The configuration of the interaction image will be explained in greater detail below.

At S420, if a touch input made with respect to the interaction image, is detected, at S430, the display apparatus 100 may change the interaction image to express the physical interaction made in accordance with the touch input. A method for changing interaction image may be implemented according to various exemplary embodiments.

Hereinbelow, a method for changing interaction image according to each exemplary embodiment will be explained.

<Example of Changing Interaction Image to Express a Physical Interaction>

Figure 5:
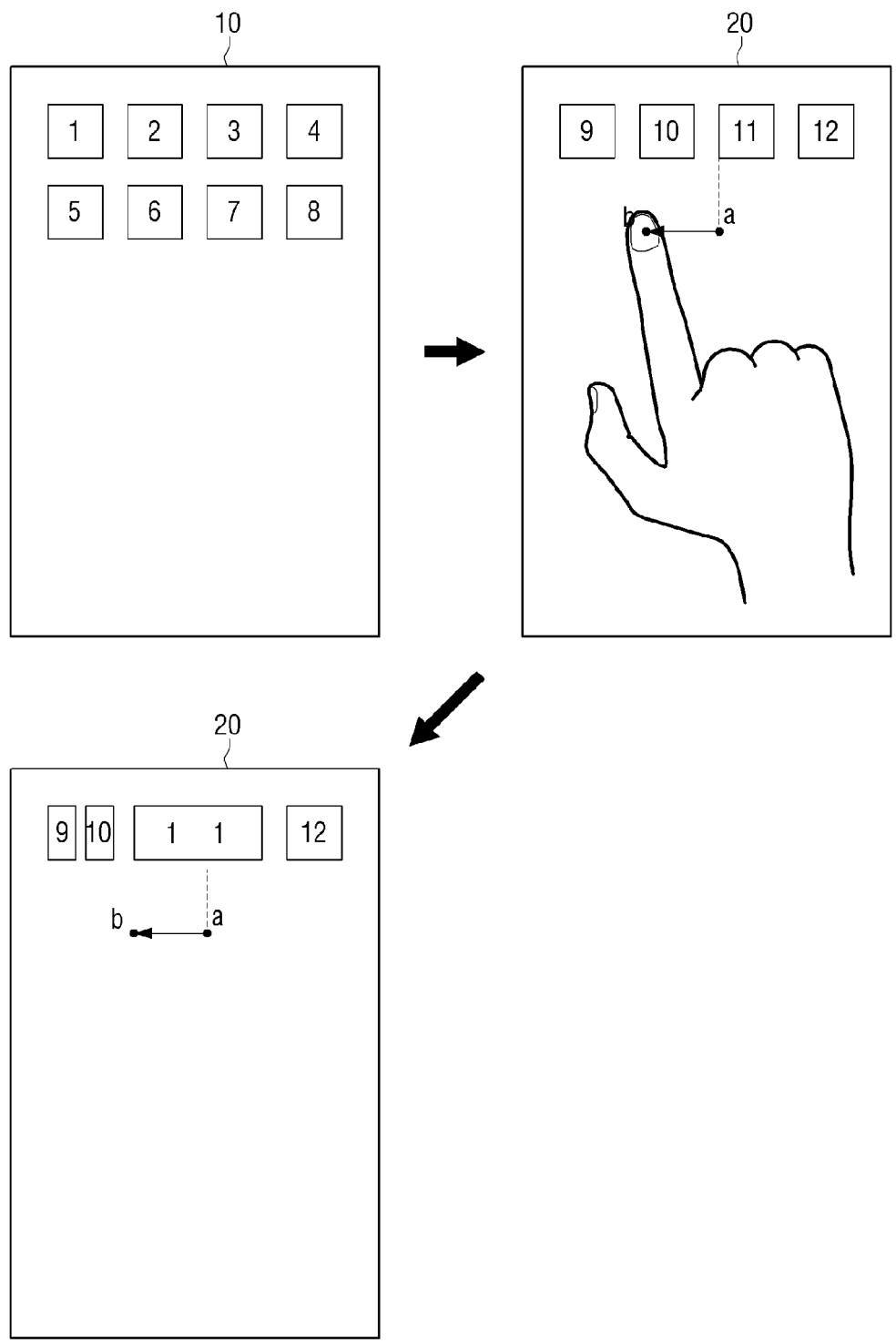
FIGS. 5 to 14 are views provided to explain a display method applicable for page switching according to various exemplary embodiment.

FIG. 5 is a view provided to explain a form of changing an interaction image according to an exemplary embodiment. Referring to FIG. 5, the display apparatus 100 displays an interaction image. To be specific, FIG. 5 illustrates an interaction image which is a background image page 10 that contains a plurality of icons 1~8. However, as explained above, the interaction image may be implemented in various forms.

Referring to FIG. 5, one background image page 10 is displayed. As the user touches in a direction moving from right to left, the current page 10 is changed to the next page 20 on the right side. The touch input may include touch & drag in which the user touches on the page 10 and slowly moves to one direction, or flick manipulation in which the user touches on and turns page abruptly to one direction. Of course, if the detecting unit 120 includes an access sensor or motion sensor instead of the touch sensor, the page may turn to the next page 20 in accordance with the user's gesture of turning a page rather than touching on a screen. For convenience of explanation, the touch input will be explained below as an example.

The control unit 130 may perform a page turning operation in sequence according to a direction of a user's touch input. If the turned page is the last page, since there is no page left, the control unit 130 may not be able to perform the page turning operation. If the user's touch input to turn a page is made, but it is not possible to turn pages anymore, the control unit 130 may change the shape of the last page to express the physical interaction (i.e., force) exerted on the last page in response to the touch input. A method for changing the shape of the last page may be varied depending on exemplary embodiments.

Meanwhile, referring to FIG. 5, if the next page 20 is the last page, in response to the user's touch input made between points a and b on the last page, the control unit 130 may fix the top, bottom, left and right boundaries of the last page 20 to the screen boundary of the display unit 110, and enlarges the size of the touched area to the direction of movement, while reducing the size of another area located in the direction of movement.

In the above example, the control unit 130 may convert the user's touch input as perceived at the detecting unit 120 into a force, and control the velocity of turning pages or degree of deforming the last page in accordance with the converted force. That is, based on a distance between a point of starting the user's touch and a point of ending the touch, the control unit 130 may calculate a force of the touch input. Further, the control unit 130 may calculate the velocity by using the distance and time consumed to move the distance. Further, the control unit 130 may calculate the recorded force which is determined to be mapped to the calculated velocity, based on the database stored at the storage unit 140. In another exemplary embodiment, the control unit 130 may directly compute the force by using various known formulae, instead of utilizing the database.

The control unit 130 may change the screen based on a unit of pages according to the direction of the user's touch input as perceived at the detecting unit, and display the result. The page changing may be made at least in one of an upper, lower, left and right directions. The user's touch input may be implemented in various forms including dragging, flicking or the like. If a relatively strong force is exerted, the control unit 130 may accelerate the speed of changing pages, or in another exemplary embodiment, change several pages at once and display the result.

If the pages are changed to the last page but the user keeps making touch input, the control unit 130 may deform the display state of the last page in accordance with the degree of force exerted by the touch input.

Referring to FIG. 5, the display state may be changed such that the touched area is enlarged according to the direction of advancing the user's touch input and the degree of exerted force. That is, if the touch input is made with a relatively stronger force, the touched area may be enlarged wider, while if the touch input is made with a relatively weaker force, the touched area may be less enlarged. Further, the 'reduced area' may be the area in the direction where the user's touch input advances. By way of example, if a page is continuously changed from right to left direction until the last page 20 is displayed, in response to the user's touch input directing to turn a page from right to left direction, the page is not turned anymore, but the touched area is enlarged, with the screen area between the boundaries thereof and the touched area being displayed in reducing size as if the area is compressed. Accordingly, the user naturally understands that it is not possible to turn the page anymore.

The touched area may be defined in various ways. By way of example, the touched area may exclusively refer to a point at which touch is inputted, or an area within a predetermined radius from a point a at which touch is inputted. Alternatively, a display area of an object including the point of touch may also be referred to as the touched area.

Referring to FIG. 5, an object (i.e., object #12) located opposite to the direction of moving touch input is not enlarged. However, in another exemplary embodiment, object #12 may also be enlarged in accordance with the enlargement of object #11.

Meanwhile, FIG. 5 illustrates an example where an extension effect of extending a portion of the screen and a compression effect thereof occur at a time according to a user manipulation, that is, an example where the object at the point of touch is extended, while top, bottom, left and right boundaries of the last page of the interaction image are fixed in place. However, the display state of the last page may be varied depending on exemplary embodiments. That is, in another exemplary embodiment, only an extension effect of an object may be represented on the screen.

Figure 6:
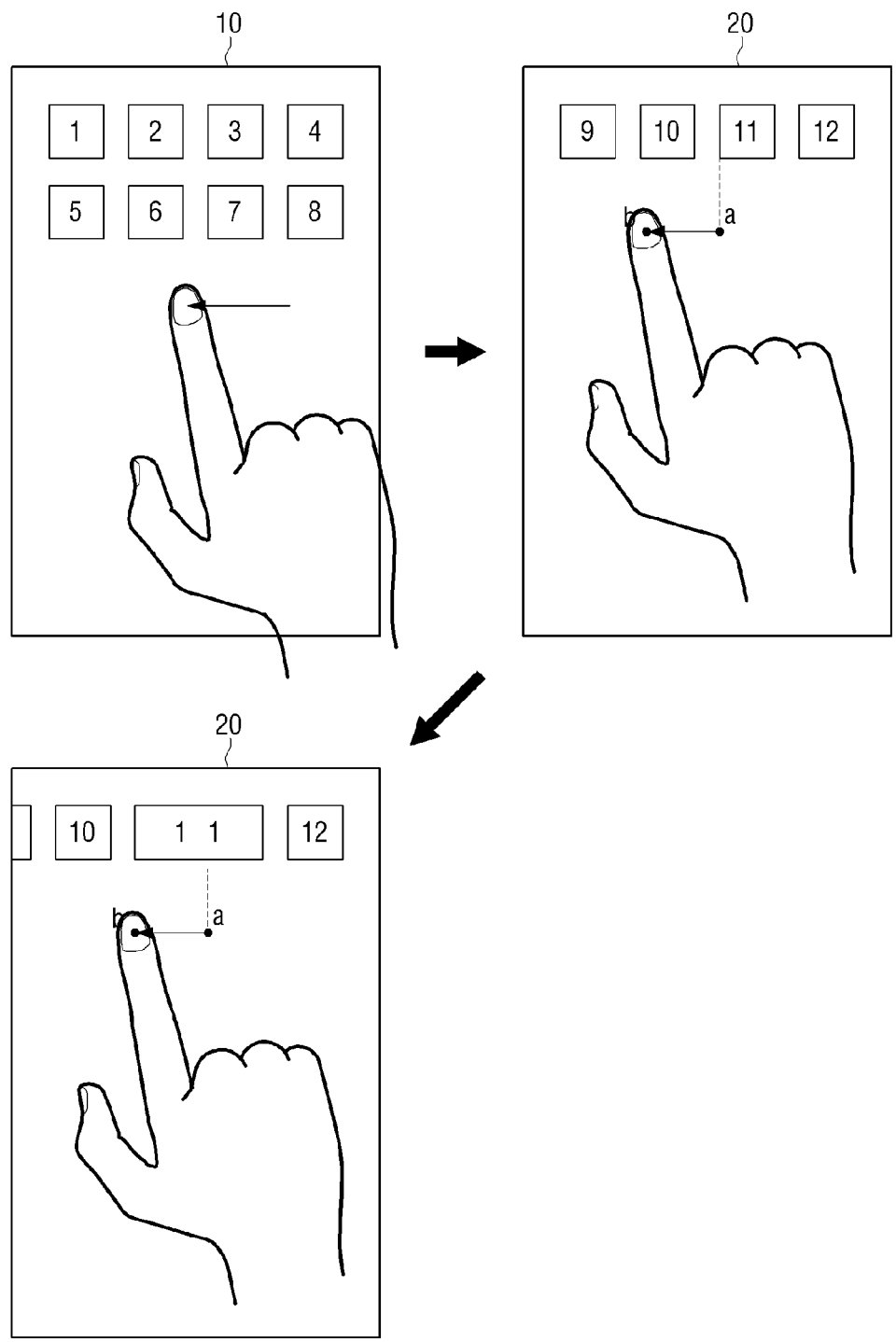

FIG. 6 is a view provided to explain a form of changing a screen according to another exemplary embodiment. Referring to FIG. 6, if the user's touch input is inputted in one direction (for example, right to left direction) in a state that one page 10 is displayed on the screen, the current page 10 is turned to the next page 20. If the next page 20 is the last page, and if the touch is inputted between points a and b on the last page, the control unit 130 may change the display state of the screen to the one illustrated in FIG. 6.

To be specific, if the touch input moves from point a to point b, the control unit 130 may fix the right boundary of the last page 20, which is located opposite to the direction of advancing the user's touch input, on the boundary of the screen. The control unit 130 may then enlarge the size of the touched area on the last page 20 according to the direction of advancing the user's touch input and degree of the force. Accordingly, an extension effect is represented. Compared with an exemplary embodiment of FIG. 6, there is a difference in that no compression effect is represented. By way of example, if the user's touch input moves from right to left direction, the area on the left side of the touched area may move along to the left direction as much as the distance of moving the touch input to disappear from the screen.

FIG. 6 illustrates an example where only the object #11 corresponding to the area of touch is enlarged. However, in another exemplary embodiment, the object #12 located opposite to the direction of moving the touch input may be enlarged together.

Although FIGS. 5 and 6 illustrate an exemplary embodiment in which the interaction image maintains a horizontal state, while some areas are displayed in enlarged or reduced forms, depending on exemplary embodiments, the interaction image may be distorted in response to the user manipulation.

Figure 7:
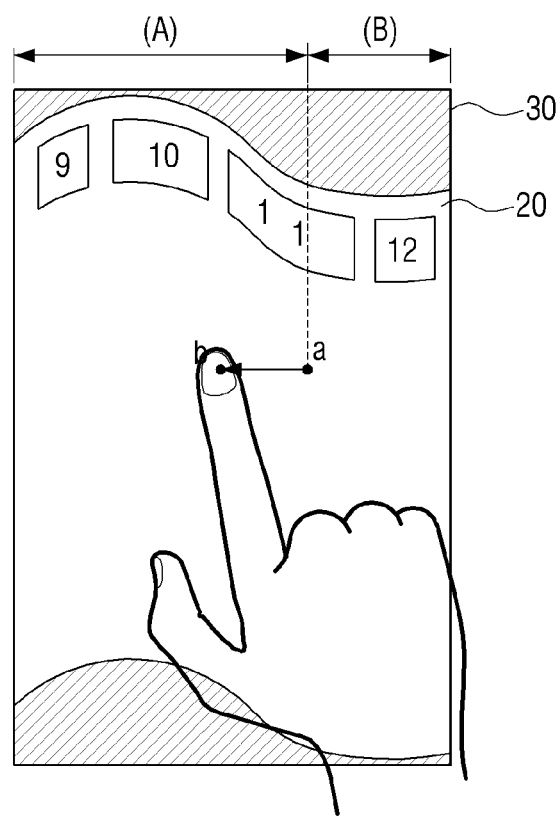

FIG. 7 is a view provided to explain the form of displaying a screen according to these exemplary embodiments.

Referring to FIG. 7, if the user's touch input is inputted on the last page 20, the control unit 130 may display an interaction image in which an area located in the direction of advancing the user's touch input is pushed up. That is, the interaction image may be distorted from the horizontal state in response to the user manipulation. Accordingly, as the user touches from point a to point b on the left side, the page 20 appears to be forcefully pulled to the left side, according to which the user intuitively understands that the current page is indeed the last page on the right side.

Referring to FIG. 7, the last page 20 may be divided into two areas A, B with reference to the point of touch, in which one area A is pushed convexly to the upper direction. The other area B may be displayed as being pushed concavely to the lower direction, or maintained in a parallel state.

In accordance with the form of the last page 20 being distorted, the rest area 30 of the entire screen may be displayed in a monochromic color such as black.

Meanwhile, the visual effect of FIG. 7 in which the touched area is displayed in convex or concaved form may be combined with an exemplary embodiment illustrated in FIGS. 5 and 6. That is, the reduced area may be displayed in convex form, while the enlarged area may be displayed in concaved form.

Further, as the touch input is discontinued, the screen display state may be returned to the original state. The velocity of recovery may be determined in proportion to the force which is converted according to the user's touch input. That is, if the touch input is inputted with strong force and then discontinues, the screen display may also be changed and then returned rapidly. The screen may be directly returned to the original status, or alternatively, may bounce for a predetermined time up and down or left and right and then gradually display the original status.

While FIGS. 5 to 7 illustrate an example where the page is turned from right to left direction, the direction of change may be varied, such as from left to right, from top to bottom, or from bottom to top. Further, although FIGS. 5 to 7 illustrate the area on the same plane as the point of touch, in another exemplary embodiment, an area within a predetermined radius to the point of touch may only be enlarged, while the other areas remain unchanged. That is, the interaction image may be changed in a manner in which the area within a predetermined radius to the point of touch "a" may be enlarged, while the ambient area thereof is distorted in response to the enlargement of the area "a". At this time, the top, bottom, right, left sides, which are a predetermined distance away from the point of touch, may remain unchanged.

When the touch input discontinues, the last page of the interaction image may be displayed in the original state.

Figure 8:
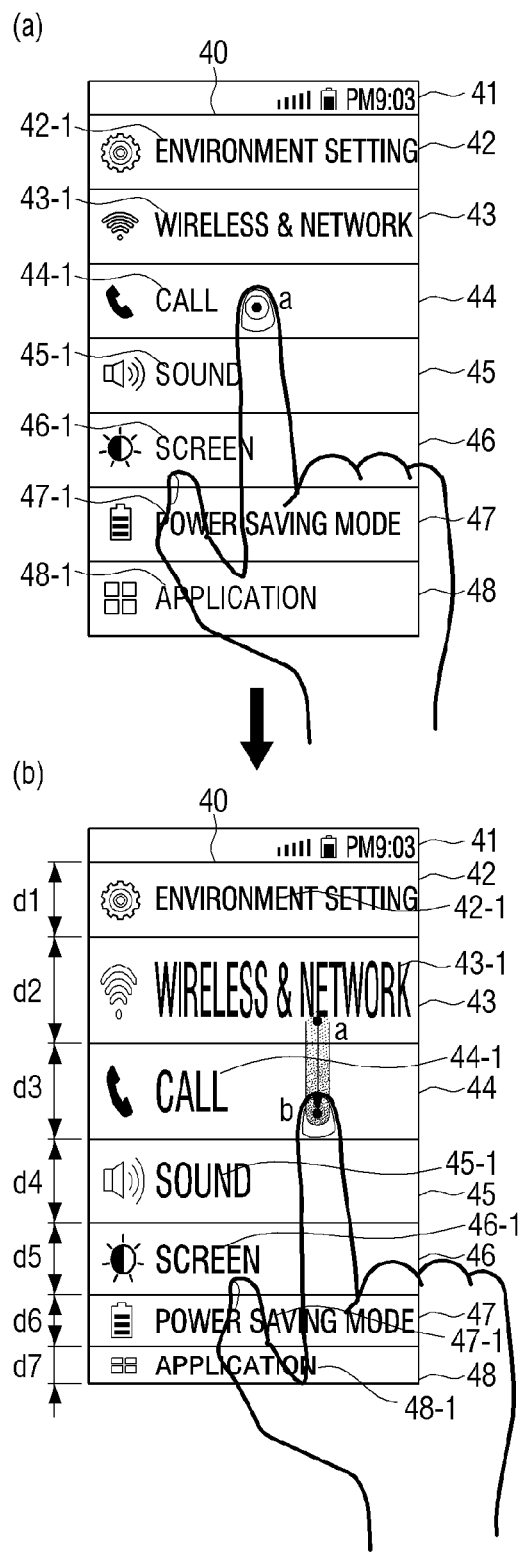

FIG. 8 is a view provided to explain a form of displaying a screen according to another exemplary embodiment. Referring to FIG. 8A, an example of an environment setting screen to set a user environment of the display apparatus 100 is illustrated. Referring to FIG. 8A, an environment setting screen 40 may be divided into a plurality of areas 41-48. The first area 41 out of the entire areas 41-47 may be realized as a notification area where various notification information such as the battery, time and status of the display apparatus 100 is displayed, and the second area 42 may be realized as a title area where the tile of the corresponding screen 40 is displayed.

Each area 41~48 may be represented distinctively from one another using a solid line, dotted line, color, etc., and objects 41-1, 42-1~48-1 such as text, an icon, a thumbnail image, etc., may be displayed on each area 41~48. A user may select an option corresponding to an area by selecting a desired area.

Meanwhile, a user may touch a certain point (a) on the screen and flick or drag the touched point in one direction as illustrated in FIG. 8A. In this case, the control unit 130 may represent an extension effect and a compression effect at the same time as illustrated in FIG. 8B. To be specific, when a user touches the fourth area 44 and flicks and drags the touched area from 'a' to 'b' as illustrated in FIGS. 8A and 8B, the area 44 corresponding to the touched point and the opposite area 43 of the moving direction are extended by the user manipulation, and the areas 45, 46, 47, and 48 in the moving direction are reduced in accordance with the user manipulation. As illustrated in FIG. 8B, the first area 41 and the second area 42 which are not involved with the list scrolling are not changed by the user manipulation.

Meanwhile, the control unit 120 may represent stronger tensile strength and compression strength with respect to areas further from a touch point and weaker tensile strength and compression strength with respect to areas closer to a touch point.

For example, when the fourth area 44 is touched and dragged as illustrated in (b) of FIG. 8 while the sizes of the entire areas 42~48 are the same, the size of the third area 43 is extended the most from among the enlarged areas 43 and 44, and the size of the eighth area 48 is reduced the most from among the reduced areas 45, 46, 47, and 48. Accordingly, the sizes d2~d7 of the enlarged or reduced areas 43~48 can be represented as d2>d3>d4>d5>d6>d7.

Referring to FIG. 8B, as each area is enlarged or reduced, the objects in each area may also be enlarged or reduced at the same time. That is, the objects 41-1, 42-1, 43-1 in the enlarged areas 41, 42, 43 may be elongated vertically along with the dragging direction, and the objects 44-1, 45-1, 46-1, 47-1 in the reduced areas 44, 45, 46, 47 may be represented transversely along with the dragging direction.

In the example of FIG. 8B, the sizes of the first area 41 and the second area 42 are not enlarged, maintain their original size d1, but depending on exemplary embodiments, these areas may also be enlarged or reduced.

FIGS. 9A and 9B are views provided to explain the form of displaying a screen according to another exemplary embodiment. For convenience of explanation, an example of the environment setting screen 40 in FIG. 8A will be illustrated in FIG. 9A. As illustrated in FIGS. 9A and 9B, when a user inputs a flick or drag manipulation in the direction of a→b on the screen, the area in the direction of 'a' is enlarged and the areas in the direction of 'b' are reduced with respect to the touched area 43. In this case, unlike FIG. 8A, the objects 43-1, 44-1, 45-1, 46-1, 47-1 and 48-1 in each area maintain their original shapes and sizes while the sizes of the areas 43, 44, 45, 46, 47 and 48 are enlarged or reduced. Except for the sizes of the objects which are fixed, other features are the same as FIGS. 8A and 8B, so further description will not be provided.

Meanwhile, various exemplary embodiments where when one point on the screen is touched and moved, deformation occurs with respect to a line including the touched area have been described above, but deformation may occur locally with respect to the touch point itself.

Figure 10:
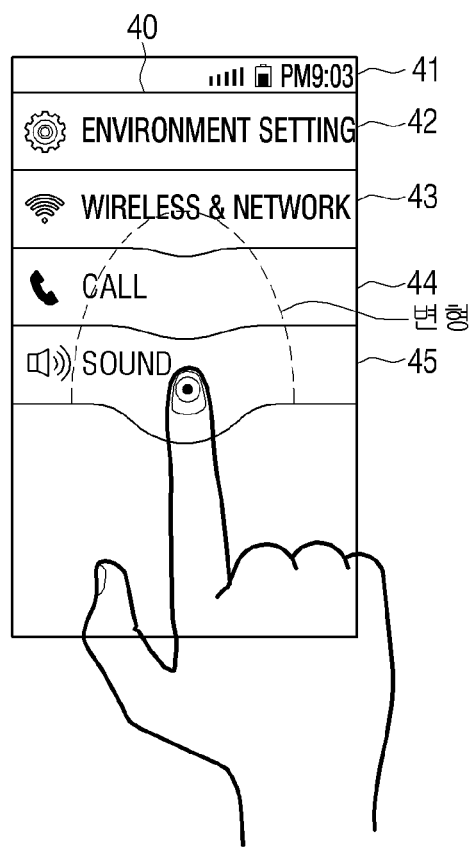

FIG. 10 is a view provided to explain the form of displaying a screen where deformation occurs locally. Referring to FIG. 10, when a user touches one point on the screen 40 and flicks or drags the touched point while the screen which are divided into a plurality of areas 41-48 are displayed, the control unit 130 changes the screen 40 as if the touched area is extended from the remaining areas. In FIG. 10, as the middle point of the fifth area 45 is touched and dragged downward, a local extension effect where the middle point is elongated downward is shown. In this case, the areas close to the touched point are extended the most, and the farther from the touched area, the lesser it is extended. Accordingly, a user may intuitively recognize when the current page approaches the last page.

Figure 9:
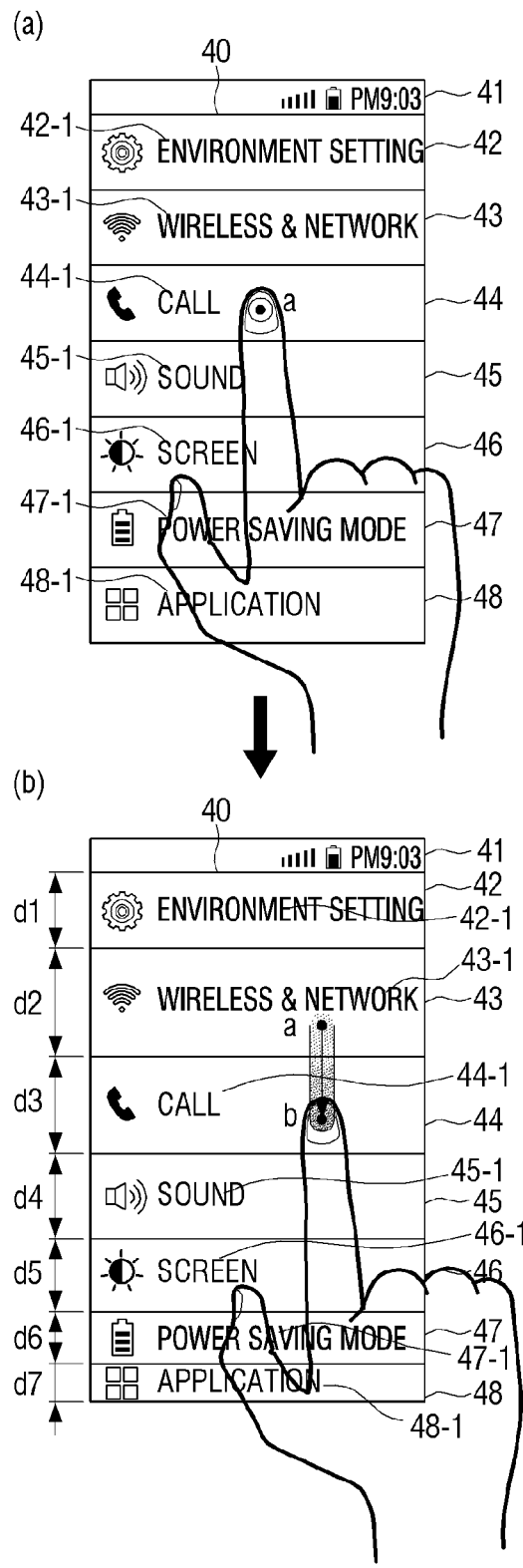

As illustrated in FIGS. 8 to 10, when a user's touch is released after the screen is changed, the control unit 130 calculates the velocity of recovery according to the strength of a user manipulation which was applied at the time when the screen was changed, and recovers the screen deformation status to its original status based on the calculated recovery velocity. In this case, the status may not be recovered immediately and instead, may be recovered after the screen is waved for the magnitude and the time corresponding to the recovery velocity with reference to the original status.

Figure 11:
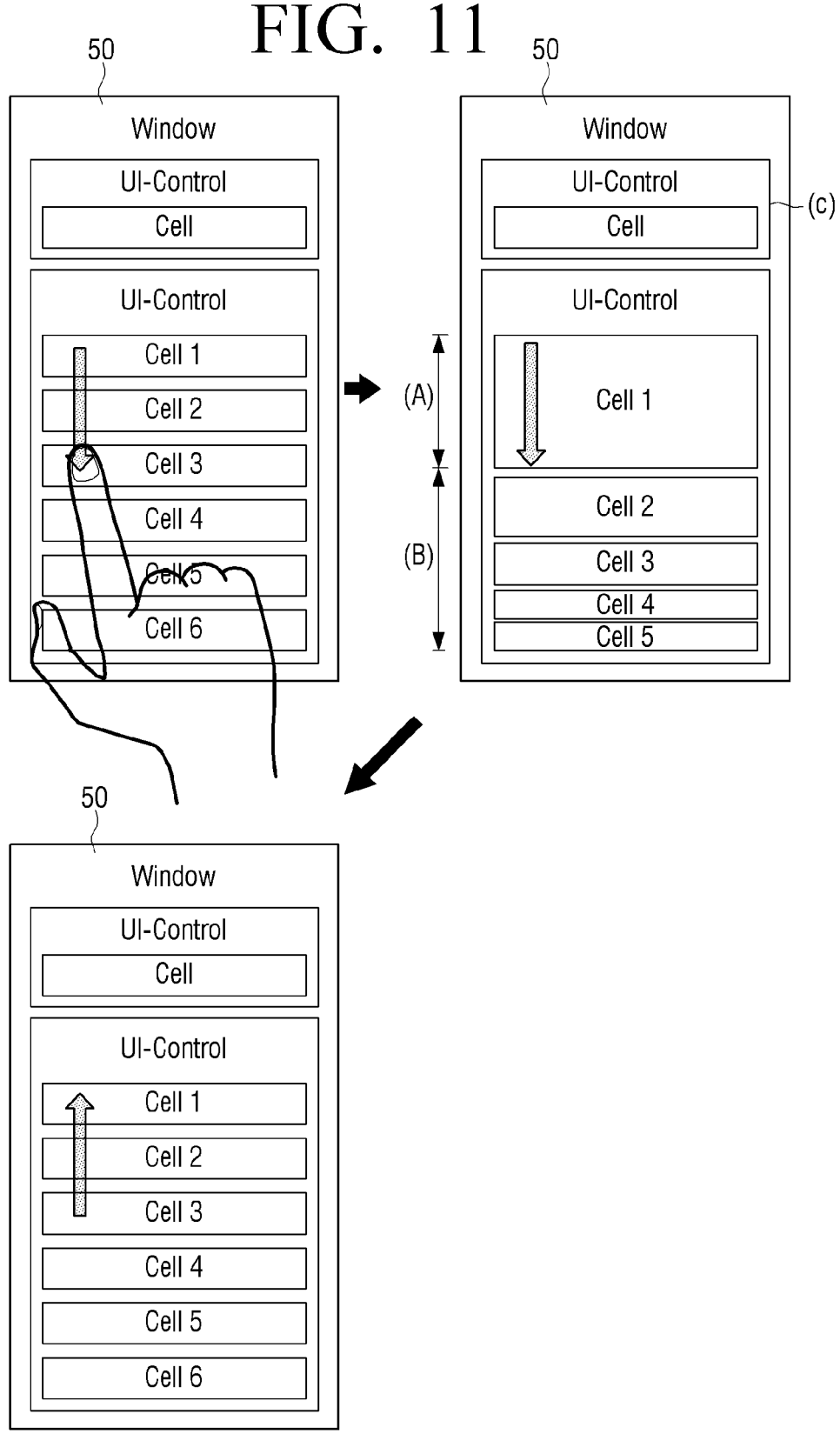

FIG. 11 is a view provided to explain the form of displaying a screen according another exemplary embodiment. Referring to FIG. 11, the display apparatus 100 displays an interaction screen 50 including a plurality of objects in the form of cell. In this case, when a user's touch manipulation to turn the page is input, the control unit 130 of the display apparatus 100 turns the page of the interaction screen.

Accordingly, when a touch manipulation to turn the page is input again while the last page 50 is displayed, the page is not turned and instead, the display form of the last page 50 may be distorted.

That is, as illustrated in FIG. 11, when a user inputs a touch manipulation in an up and down direction on the last page 50, the touched area A may be enlarged, while the area B which is in the direction of the user's touch manipulation is reduced. In this case, the area C which is in the opposite direction of the user's touch manipulation is not extended, maintaining its original status. In this case, when the touch status is terminated, the touched area A is reduced to its original status, and the screen display status is also recovered to its original status.

Meanwhile, it is possible to allow a user to recognize that the last page is displayed intuitively using other various graphic effects in addition to the extension effect and the compression effect.

Figure 12:
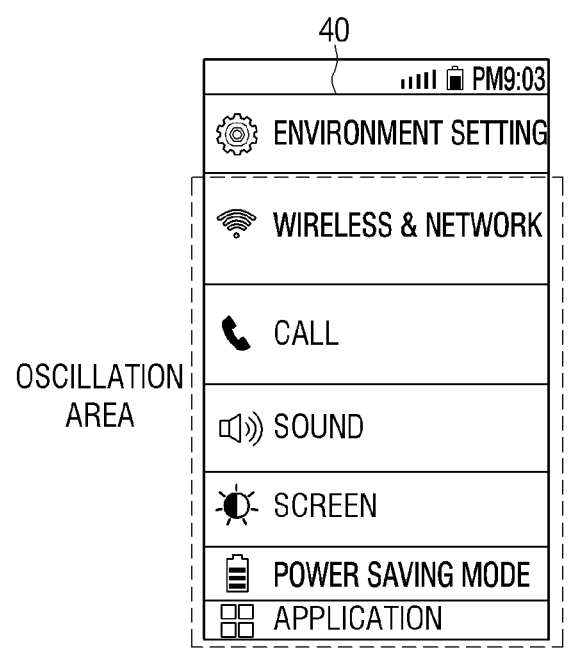
Figure 13:
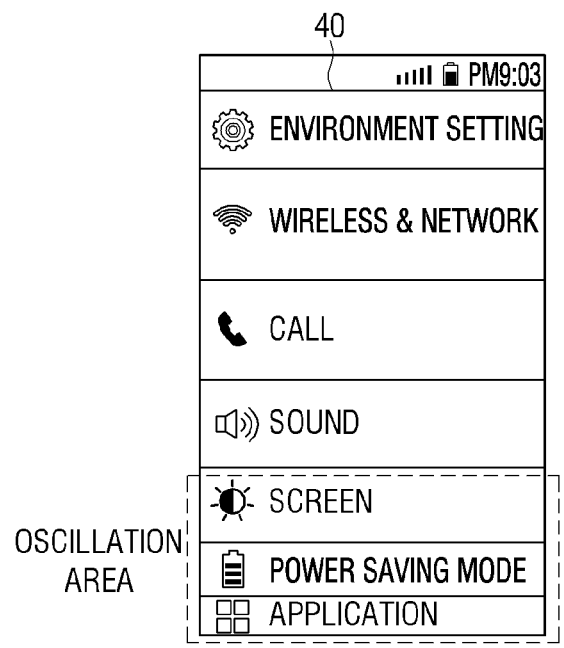

FIGS. 12 and 13 illustrate examples using an oscillation effect. Referring to FIG. 12, when deformation occurs due to a user manipulation on the last page, the control unit 130 represents a compression effect or an extension effect to a certain extent in accordance with the user manipulation. The control unit 130 may represent the oscillation effect in order to inform a user that further deformation would not occur when a user manipulation is input repeatedly and thus, a deformation effect reaches a threshold level. FIG. 12 illustrates a case where the entire screen is oscillated, and FIG. 13 illustrates a case where only a compressed area is oscillated. Accordingly, a user may intuitively understand that the last page is currently displayed, and further deformation will not occur any longer.

FIGS. 12 and 13 illustrate cases where only a visual oscillation effect is provided, but depending on exemplary embodiments, a vibration feedback may also be provided. For example, when the display apparatus 100 further comprise a vibration actuator and deformation which exceeds the threshold level occurs, the control unit 130 may control to represent the oscillation effect on the screen as illustrated in FIG. 12 or FIG. 13 and drive the vibration actuator so that a user may feel the actual vibration.

Other than the vibration effect, various graphic effects may be provided. For example, when a drag manipulation or a flick manipulation which exceeds a certain level is applied to a certain portion of the screen, the control unit 130 may represent a graphic effect where the image around the portion of the touch manipulation looks torn or cracked.

As described above, when a page is turned on the last page, the interaction screen may be changed in various forms. In FIGS. 5 to 13, the case where the layout of the interaction screen is changed has been explained in detail, but other elements than the layout, such as color, brightness, contrast, etc. may be changed.

Figure 14:
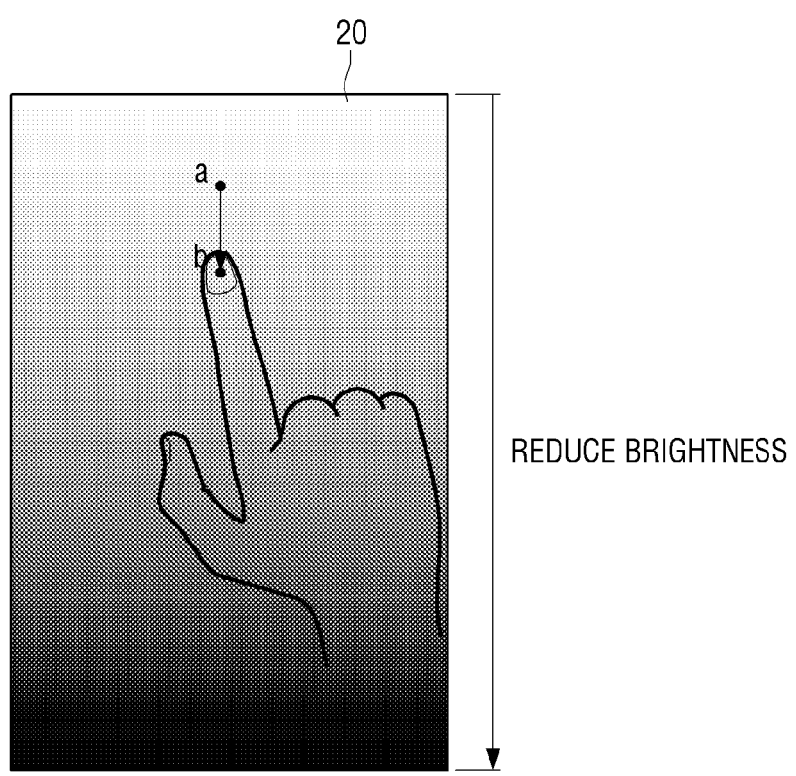

FIG. 14 is a view provided to explain the form of displaying a screen according another exemplary embodiment. Referring to FIG. 14, when a user's touch manipulation is in put in an up and down direction on the last page 20, the control unit 130 increases the brightness of the touched area gradually, and decreases the brightness of other areas gradually. Accordingly, shade is applied to the last page 20, allowing a user to have a stereoscopic sense.

The brightness adjustment operation of FIG. 14 may be performed in combination with the exemplary embodiments illustrated in FIGS. 5 to 13. That is, when a touched area is enlarged, the brightness of the enlarged area may be increased, and the brightness of the reduced area, if any, may be decreased. In addition, the brightness of the area which is pushed upward may be increased, and the brightness of other areas may be decreased.

Meanwhile, according to another exemplary embodiment, the physical operation applied on the interaction screen by a user's touch manipulation may be represented in a stereoscopic manner. In this case, the detecting unit 120 of FIG. 1 may further comprise a pressure sensor. The pressure sensor detects the pressure of a user's touch manipulation, that is, the strength of touch on the screen.

The control unit 130 adjusts the feeling of depth of the touched area and other areas differently according to the pressured detected by the pressure sensor. The adjustment of the feeling of depth may be performed in the graphic processing unit 137 of the control unit 130. That is, the touched area may be expressed as if it is dented, and other areas may be expressed as if they are swollen.

Meanwhile, as described above, a user's touch manipulation may be realized as a flick manipulation or a drag manipulation.

When a flick manipulation is input, a screen display status is changed according to a distance between the touched area where the flick manipulation is input for the first time and the touched area where the flick manipulation is input for the last time. When the flick manipulation is terminated, the control unit 130 recovers the display status of the last page to its original status at a recovery speed corresponding to the strength.

When a drag manipulation is input, the control unit 130 changes the display status of the last page continuously according to a distance between the touched area where the drag manipulation is input for the first time and the dragged area, that is, the current touched area. Subsequently, when the drag manipulation is terminated, the display status of the last page is recovered to its original status.

In the above exemplary embodiments, the control unit 130 calculates recovery force based on the strength of a user's touch manipulation, and calculates an adjustment rate and an interpolation rate of each area based on the calculated recovery force. In addition, the control unit 130 may recover the screen to its original status according to the calculated adjustment rate and interpolation rate.

Figure 15:
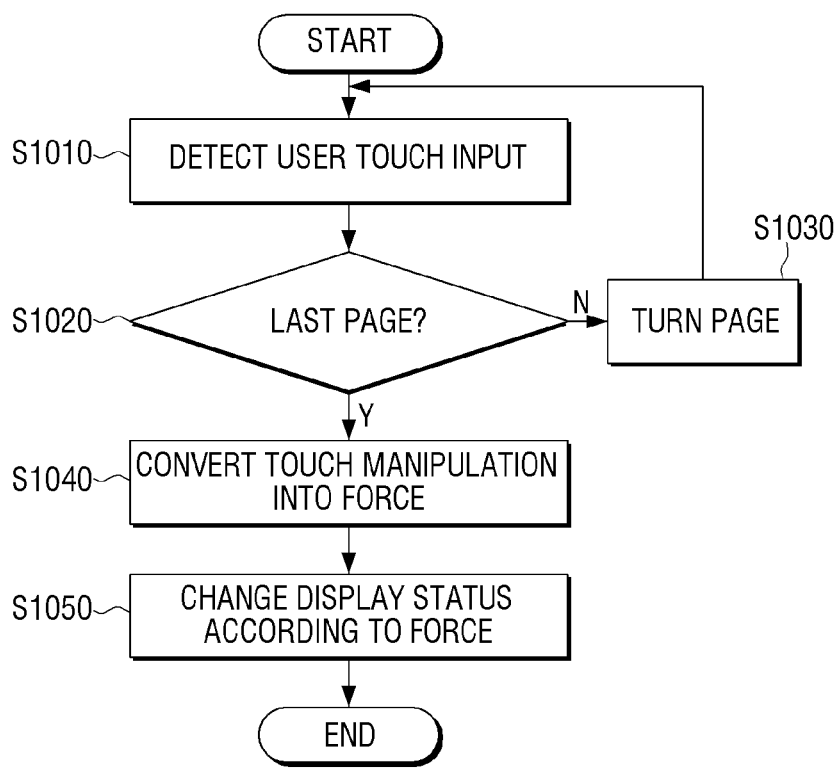
FIGS. 15 and 16 are flowcharts provided to explain a display method applicable for page switching according to various exemplary embodiments.

FIG. 15 is a flowchart provided to explain the form of displaying a screen according another exemplary embodiment. Referring to FIG. 15, when a user's touch manipulation is detected (S1010), it is determined whether the current page is the last page or not (S1020). If it is determined that the current page is not the last page, the page is turned to the next page according to the direction of the user's touch manipulation (S1030).

On the other hand, if it is determined that the current page is the last page, the touch manipulation status may be converted into strength (S1040), and the display status may be changed according to the converted strength (S1050). The method for changing a display status may be performed in various ways as illustrated in FIGS. 5 to 14.

In this case, the size of the touched area may vary depending on the intensity of the user's touch manipulation. That is, if a strong touch is detected, a larger touched area may be set, and a weak touch is detected, a relatively smaller touched area may be set. In addition, the degree of expanding or reducing the touched area and the degree of changing the screen display may also be changed according to the strength.

Figure 16:
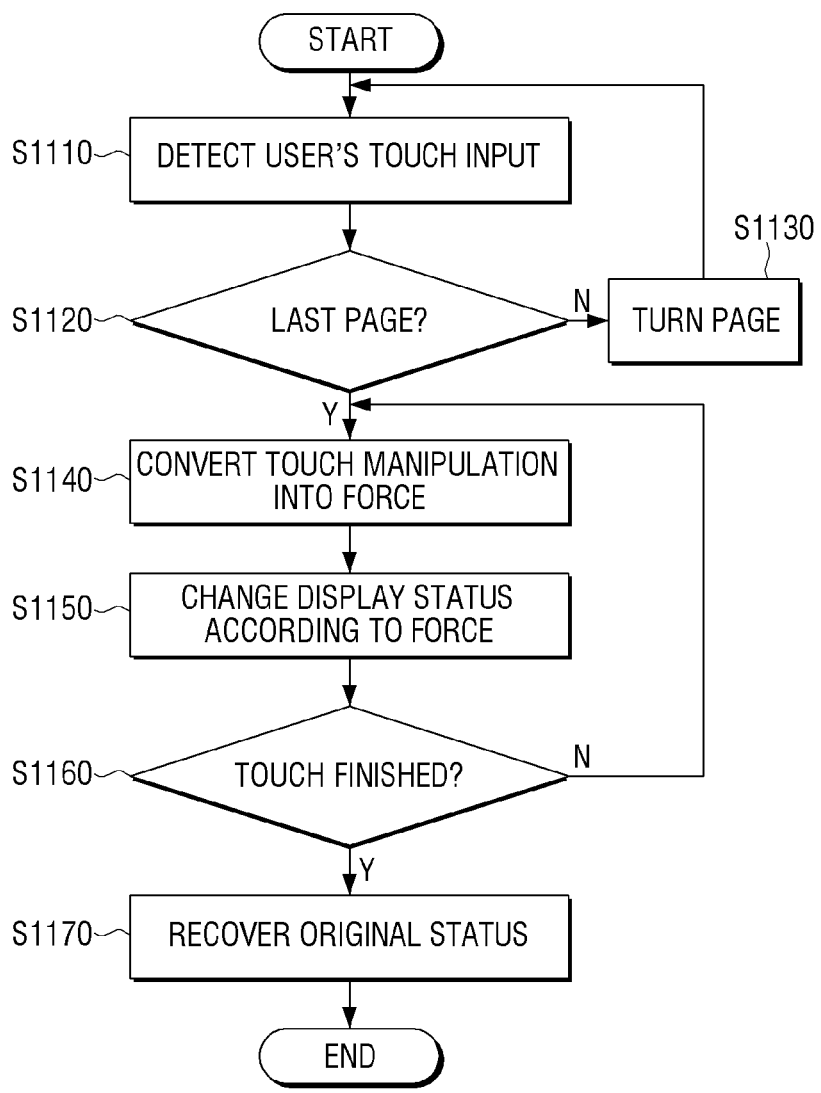

FIG. 16 is a flowchart provided to explain a process when a touch is terminated. Referring to FIG. 16, when a user's touch manipulation is detected (S1110), a page is switched, or a page display status is changed (S1120, S1130, S1140, S1150). As these operations have been described above with reference to FIG. 15, further description will not be provided.

Until the touch status is terminated (S1160), the touch status may be converted into strength continuously and, the display status may be updated accordingly. Meanwhile, when the touch status is terminated, it is recovered to its original status (S1170). When it is recovered to its original status, a bouncing effect may be applied as described above.

Figure 17:
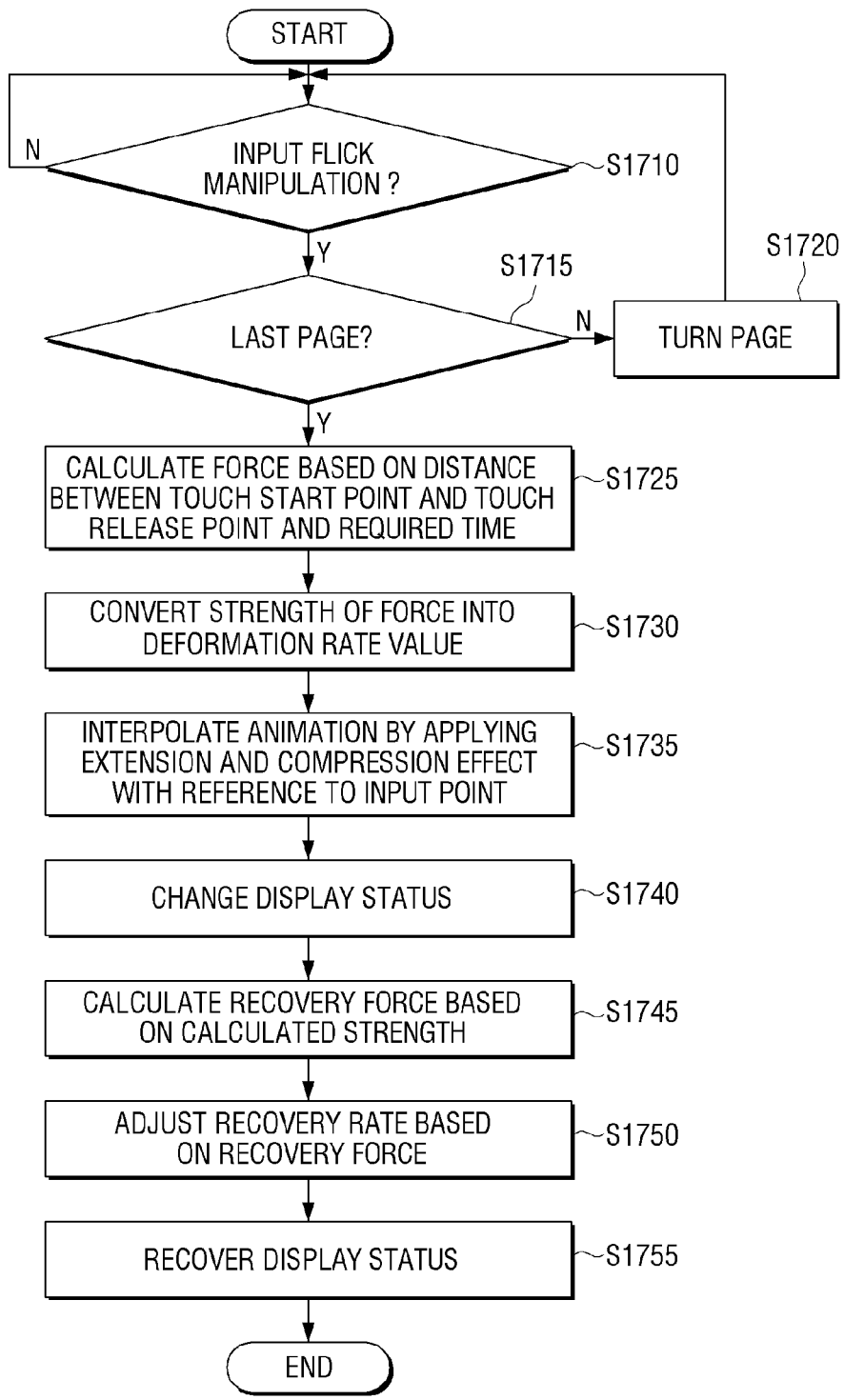
FIG. 17 is a flowchart provided to explain a display method when a flick manipulation is inputted in detail.

FIG. 17 is a flowchart provided to explain an interaction method when a flick manipulation is input in greater detail. Referring to FIG. 17, the control unit 130 determines whether a user inputs a flick manipulation or not (S1710). Specifically, when the area which is touched for the first time is different from the area which is touched for the last time, the control unit 130 may calculate a speed based on the distance between the areas and the time required until the touch is released. When the calculated speed is greater than a predetermined threshold speed, the control unit 130 may determine that it is a flick manipulation.

When it is determined that a flick manipulation is input, the control unit 130 determines whether the current page is the last page or not (S1715). If it is determined that the current page is not the last page, the control unit 130 turns the page to another page according to the direction of the flick manipulation (S1720). That is, when a flick manipulation in a right to left direction is input, the next page is displayed, and when a flick manipulation in a left to right direction is input, the previous page is displayed. The page may be turned by page unit, but is not limited thereto. That is, a screen may be scrolled to move to another page according to a user manipulation.

Meanwhile, if it is determined that the last page in the direction of the flick manipulation is displayed, the control unit 130 calculates strength applied by the user manipulation based on the distance between the area where the touch is input and the area where the touch is released, and the required time (S1725). Subsequently, the intensity of the calculated strength is converted into a deformation rate value (S1730), and an animation is interpolated based on the deformation rate value with reference to the area where the user manipulation is input (S1735). The control unit 130 renders an interaction screen by applying the interpolated animation, and changes the screen display status (S1740). That is, an interaction screen where part of the screen is compressed and other part of the screen is extended with respect to the input area is displayed. In addition, the control unit 130 calculates recovery force based on the calculated strength (S1745), adjusts a recovery rate based on the recovery force (S1750), and recovers the display status according to the adjusted recovery rate (S1755). That is, when a flick manipulation is input, the control unit 130 changes the screen significantly, at the time of the flick manipulation, and recovers the screen display status to its original status gradually. Accordingly, a user may intuitively recognize that the current page is the last page.

Figure 18:
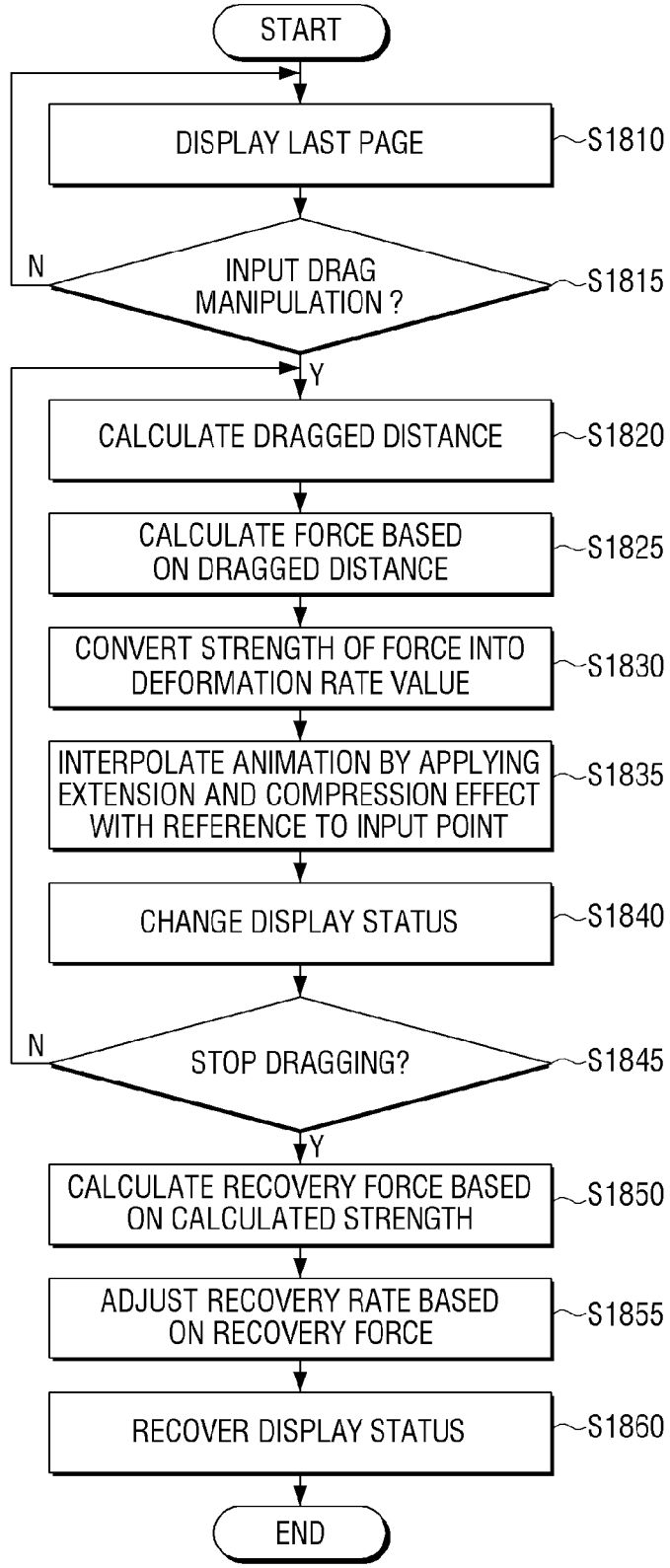
FIG. 18 is a flowchart provided to explain a display method when a drag manipulation is inputted.

FIG. 18 is a view provided to explain an interaction method when a drag manipulation is input. Referring to FIG. 18, when a user's drag manipulation is detected (S1815) while the last page is displayed on the display apparatus 100 (S1810), the control unit 130 calculates the distance between the area where the touch is input for the first time and the area where the touch is input for the last time, that is, the dragged distance (S1820). If a dragging trace is not a straight line, the shortest distance between the area where the first touch is input and the area where the last touch is input is calculated as the dragged distance.

The control unit 130 calculates strength based on the dragged distance (S1825), and converts the intensity of the calculated strength into a deformation rate value (S1830). That is, the greater the strength, the greater the deformation value. The control unit 130 may interpolate an animation by applying at least one of an extension effect and a compression effect according to the deformation rate value with reference to the area where the user manipulation is input (S1835). In addition, the control unit 130 may change the screen display status by adding the interpolated animation and displaying the interaction screen (S1840).

In this case, when the touch status is released and the dragging is stopped (S1845), the control unit 130 calculates recovery force based on the calculated strength, and adjusts the recovery rate according to the calculated recovery force (S1855). In addition, the control unit 130 recovers the display status according to the adjusted recovery rate (S1860).

Other than the above-described flick and drag manipulations, various user manipulations may be input and in such cases, the screen may be also changed according to the user manipulations.

Although in the above various exemplary embodiments (FIGS. 15 to 18), the user's touch input may be converted into force and the display state may be changed in accordance with the converted force, in another exemplary embodiment, conversion into force may not be implemented, but the display state may be changed directly according to the manipulation characteristics by taking into consideration manipulation characteristics such as moved distance of the point touched by the user, moving velocity, or the like.

As explained above, in various exemplary embodiments, pages may be changed in various directions in response to the user's touch input until the last page appears. In the last page, the movement of the page image may be provided in animation with distinguishing features from the conventional examples to thereby indicate the last page continuously and also naturally.

Meanwhile, examples of changing an interaction image according to touch input in the last page have been explained so far, in which the pages of the interaction image are turned by a unit of a page.

Hereinbelow, configuration of an interaction image in different forms and a method for changing the same will be explained.

Figure 19:
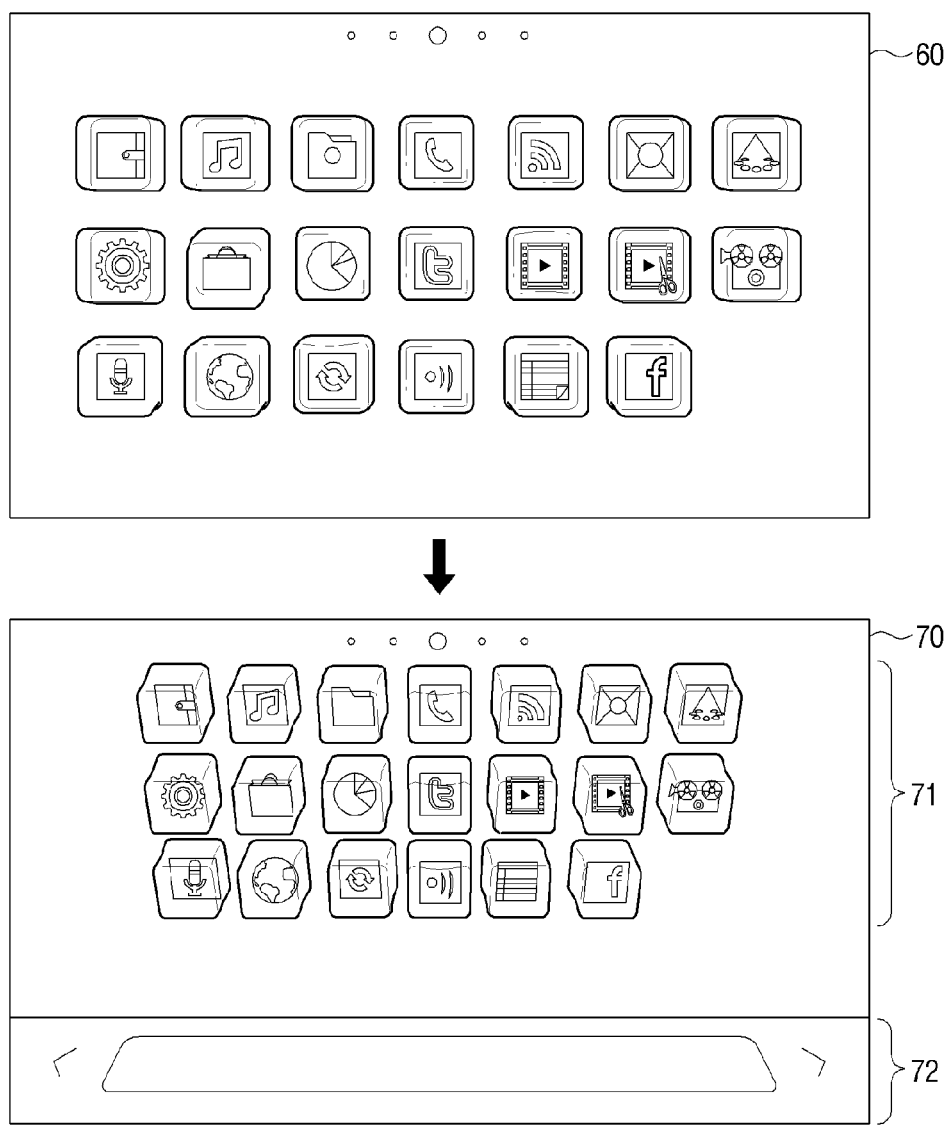
FIGS. 19 to 25 are views provided to explain display methods according to various exemplary embodiments.

FIG. 19 is a view illustrating the configuration of an interaction image changed according to a mode change. Referring to FIG. 19, the interaction image may be implemented as a background image that contains icons.

Referring to FIG. 19, in normal mode, icons representing applications or functions installed on the display apparatus 100 may appear on the interaction image 60. In this state, the user may change to edit mode by inputting a mode change command to change to edit mode. The mode change command may be inputted in various manners depending on the characteristic of the display apparatus 100. By way of example, the user may select the button 160 provided on the main body of the display apparatus 100, or input a long touch on the background area of the interaction image 60 on which no icon is displayed. Alternatively, the user may shake, rotate by a predetermined angle, or tilt the display apparatus 100 to input the mode change command. Further, the user may also input the mode change command by using an external remote control or proper external device.

In response to the mode change command as inputted, the display apparatus 100 may change to the edit mode, and the interaction image 60 may be changed to be suitable for editing. For convenience of explanation, the interaction image in edit mode will be referred as 'edit image 70'.

The edit image 70 may include an icon display area 71 on which icons which were displayed on the interaction image 60 before changes are displayed, and a collecting area 72.

The icons displayed on the icon display area 71 may be in distinguishable forms from the icons displayed on the interaction image 60 before change occurs, to help the user to intuitively understand that the icons are now editable.

FIG. 19 illustrates an example in which the icons on the interaction image 60 before a change occurs, are displayed in the form of cubical, soft objects, and when the mode changes to an edit mode, the edit image 70 may appear on which the icons that were displayed on the interaction image 60 before change are now viewed from above at a predetermined angle with respect to the front of the icons. Accordingly, on the edit image 70, the icons on the icon display area 71 are displayed in slightly tilted forms to the front direction. At the same time, the collecting area 72, which is not apparent in the interaction image 60 before change, now appears on the bottom side. That is, in response to the mode change command, the control unit 130 may express the edit image 70 by naturally changing the interaction image 60 to the form viewed from above.

If the user touches an icon on the icon display area 71, the touched icon is moved to the collecting area 72 and displayed. That is, in response to the user's touch input with respect to the icon, the icon is displayed as if the icon is separated off from the original location and dropped downward by gravity.

The collecting area 72 may include a move mark. The 'move mark' may include an arrow or the like to indicate that the collecting area 72 may be changed to another collecting area. Referring to FIG. 19, if the collecting area 72 includes a move mark 71-b on the right side, and if the user touches the collecting area 71 and then drags or flicks to the left side, another collecting area next to the current collecting area 72 is displayed on the bottom of the icon display area 71.

FIG. 19 illustrates an example where the icons on the interaction image 60 before change and on the icon display area 71 are displayed in the form of soft objects such as jelly, but this is written only for illustrate purpose. In another exemplary embodiment, the icons may be displayed in general polygonal forms, or in two-dimensional icon forms as generally adopted in the conventional display apparatus.

Further, although FIG. 19 illustrates an example where the point of viewing the icons are changed so that the icons are expressed in forms that are tilted frontward by a predetermined angle. Accordingly, in another example, the icons may be placed horizontally, and tilted to the right or left side. Further, the icons may be expressed via vibration in their positions.

Further, although FIG. 19 illustrates an example where only the icons that were displayed on one interaction image 60 before change are displayed on the icon display area 71 of the edit image 70. Alternatively, if the interaction image is changed to the edit image, along with the icons displayed on the interaction image 60 before change, some of the icons displayed on the page preceding or following the interaction image 60 before change may also be displayed on the icon display area 71. Accordingly, the user intuitively understands that it is possible to change to a previous or following page.

Figure 20:
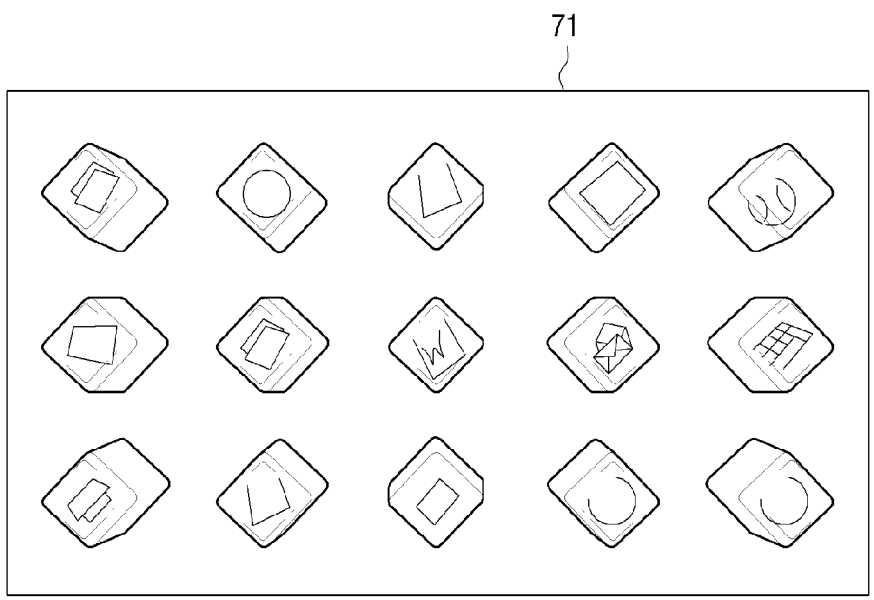

FIG. 20 illustrates an icon display area 71 in a different form from that illustrated in FIG. 19. Referring to FIG. 20, the respective icons may be expressed as if these are placed horizontally on the image and tilted to the left side by approximately 45 degrees. Accordingly, the user perceives it as if the icons are suspended on the screen and thus can intuitively understand that the icons will fall in response to touch.

FIGS. 21 to 24 are views provided to explain a process of collecting icons into the collecting area in response to the user's touch input.

Figure 21:
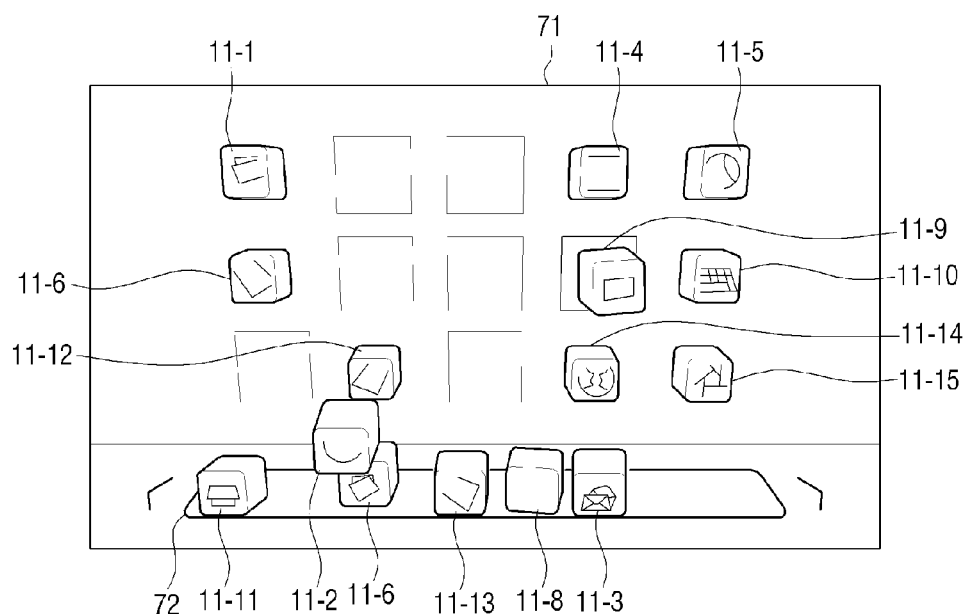

Referring to FIG. 21, in a state that a plurality of icons 11-1 to 11-15 are displayed on the icon display area 71, if the user touches the icons one by one, the icons fall to the collecting area 72 provided on the bottom side of the icon display area 71 as the icons are touched. FIG. 21 particularly shows an example in which six icons 11-3, 11-8, 11-6, 11-11, 11-12, 11-13 are already collected in collecting area 72, and another icon 11-9 is currently touched. The icons in FIG. 21 are displayed in the form of three-dimensional cubes, and the icons may fall onto another icon, or turned upside down, depending on where the icons fall.

If the icon 11-9 is touched, the icon 11-9 may be expressed as being separated from the original location, as a physical interaction in response to the touch input.

Figure 22:
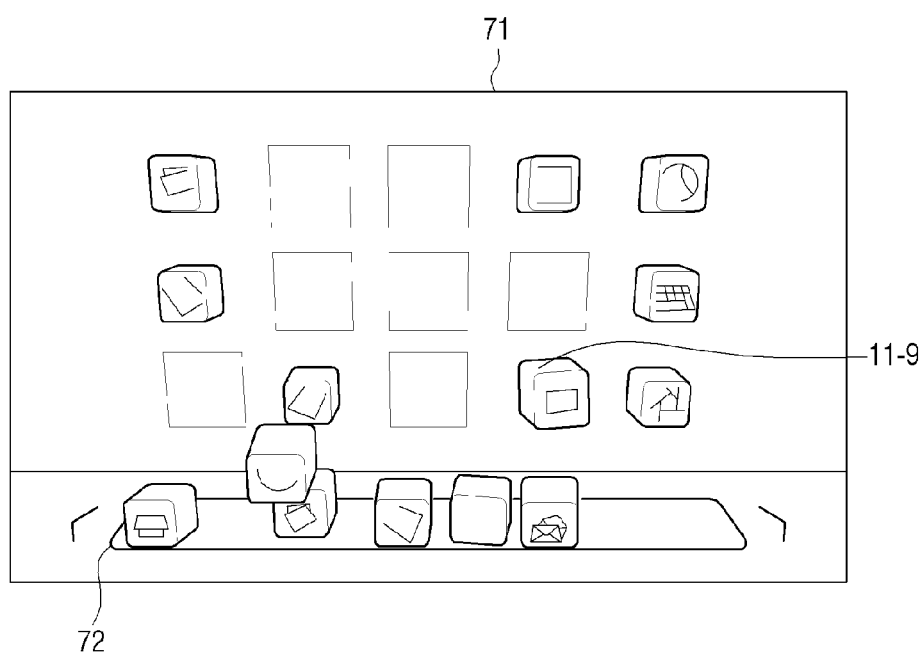
Figure 23:
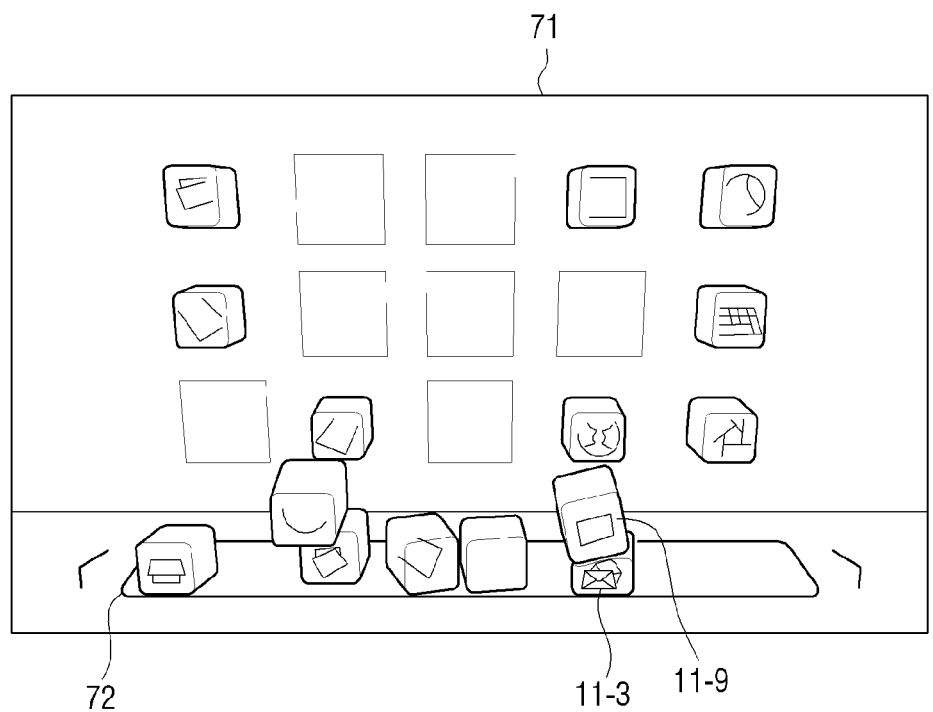

Referring to FIGS. 22 and 23, the touched icon 11-9 gradually falls down and moved to the collecting area 72. Referring to FIG. 23, if there is another icon 11-3 collected in the bottom in the direction where the icon 11-9 is falling, it is certain that the icon 11-9 will collide into the icon 11-3. Accordingly, the icons 11-9 and 11-3 are expressed as being crumpled. That is, the control unit 130 may control the computing unit 137-2 to compute change value based on the collision between the icons, and control the rendering unit 137-1 to generate an interaction image based on the computed result.

Figure 24:
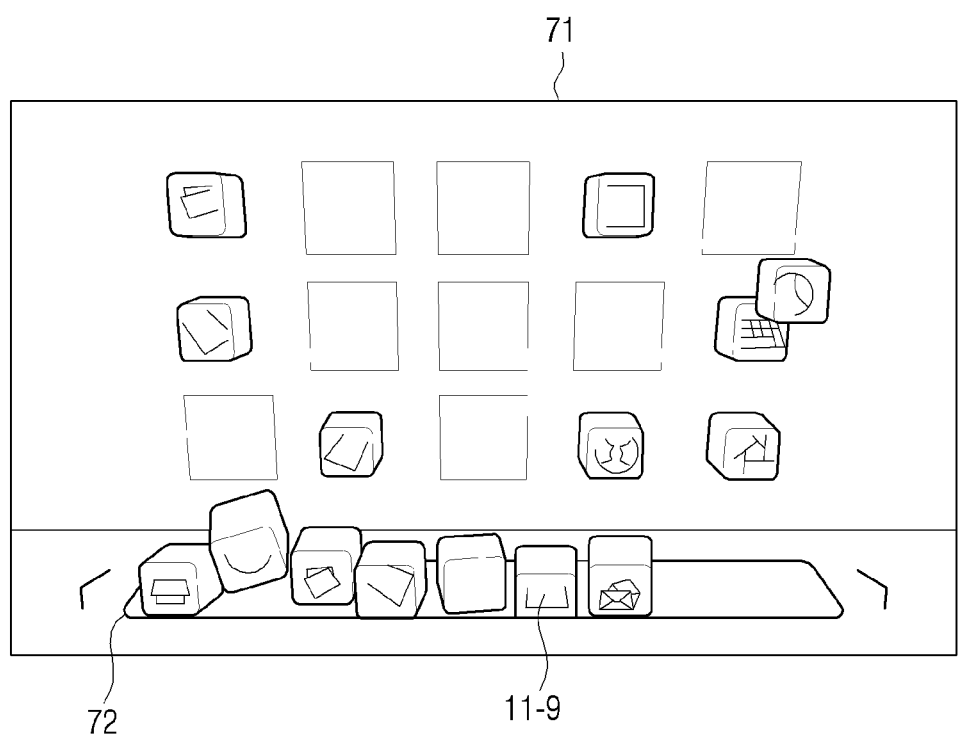

Next, referring to FIG. 24, the icon 11-9 colliding with another icon 11-3 stops moving and settles in the collecting area 72. Meanwhile, if the number of icons collected in the collecting area 72 exceeds a preset threshold, the control unit 130 may display a message 73 to inform that the collecting area 72 is full. The location of displaying the message 73, the content of the message 73 or the way to display the message 73 may vary depending on exemplary embodiments. Further, although the term 'collecting area' is used herein, this can be termed differently, such as 'Dock area', 'edit area', or the like.

Referring to FIGS. 22 to 24, the user may collect the respective icons in the collecting area 72 and change a page so that the icon display area 72 is turned to another page. The user may transfer the individual icons in the collecting area 72 to the changed page, or transfer the icons in a plurality of groups to the changed page. That is, it is possible to perform operation to move location to display icons, by using the collecting area.

Figure 25:
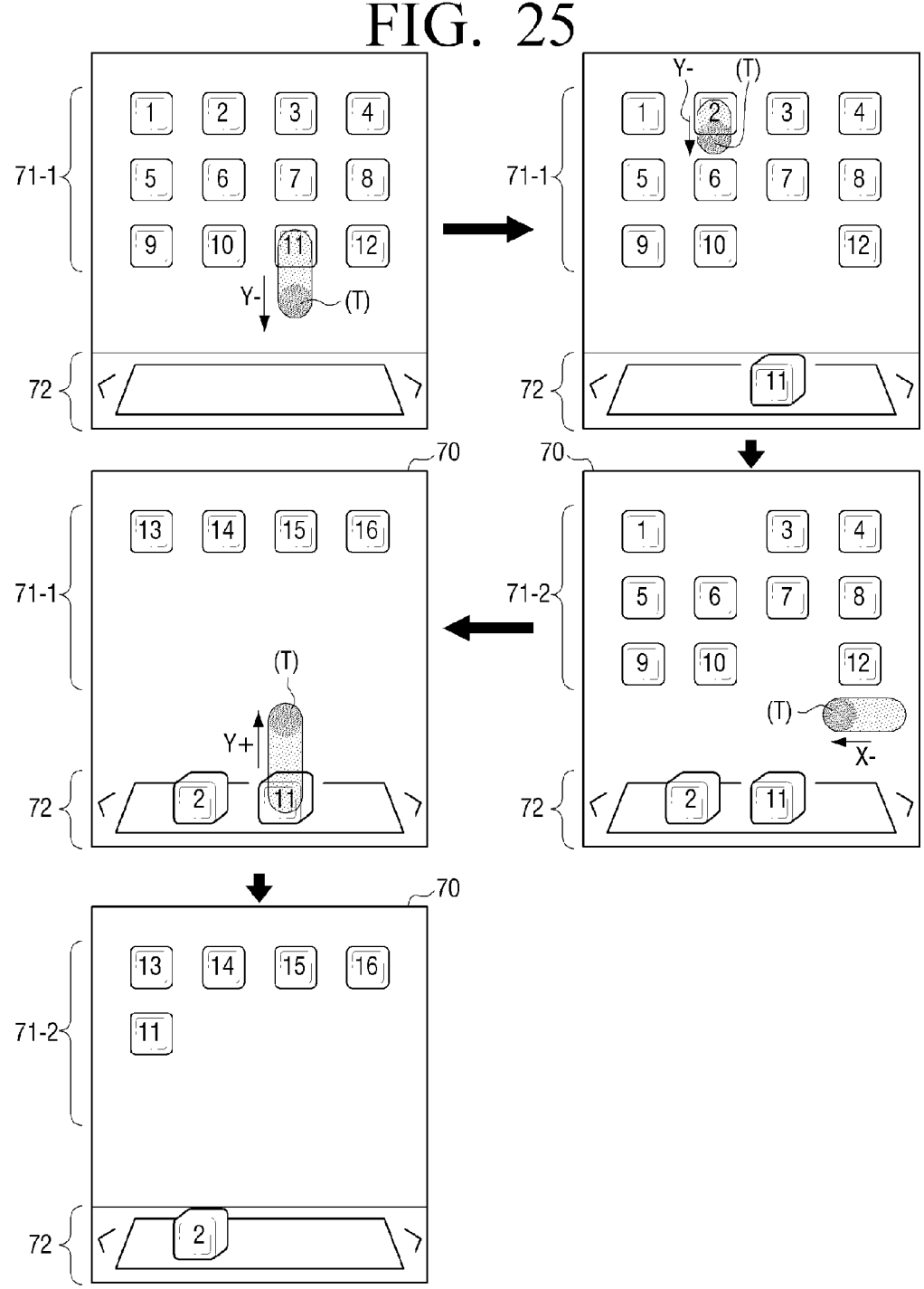

FIG. 25 is a view provided to explain a process of moving the location to display icons by using the collecting area. For convenience of explanation, referring to FIG. 18, the two-dimensional X-Y axis coordinates will be used. According to FIG. 25, the first page 71-1 is displayed in the icon display area and the user touches icon #11 and drags or flicks to Y-direction, i.e., to downward direction. Accordingly, icon #11 drops into the collecting area 72. In this state, if the user touches icon #2, icon #2 also falls into the collecting area 72.

The user may also touch the icon display area and at the same time, drag or flick in X-direction. In this case, the second page 71-2 is displayed on the icon display area, and icons #2, #11 are continuously displayed in the collecting area 72. In this state, if the user touches icon #11 displayed in the collecting area 72 and drags or flicks it in Y+ direction, the control unit 130 controls so that icon #11 moves up the second page 72-2 and is displayed on the second page 71-2. If dragging is inputted, icon #11 may be displayed at a location where the dragging touch finishes, or if flicking is inputted, icon #11 may be displayed next to icons #13, #14, #15, #16 which are already displayed in the second page 71-2. Although the example where the icons are moved to the very next page, in another exemplary embodiment, icons may be moved to the collecting area on a plurality of pages and transferred to the respective pages as intended by the user.

Meanwhile, depending on a setting made by the user, an icon may have a rigid or soft property. The 'rigid body' has a hardness so that it maintains its shape or size even with the exertion of external force, while the 'soft body' changes shape or size with the exertion of external force.

Figure 26:
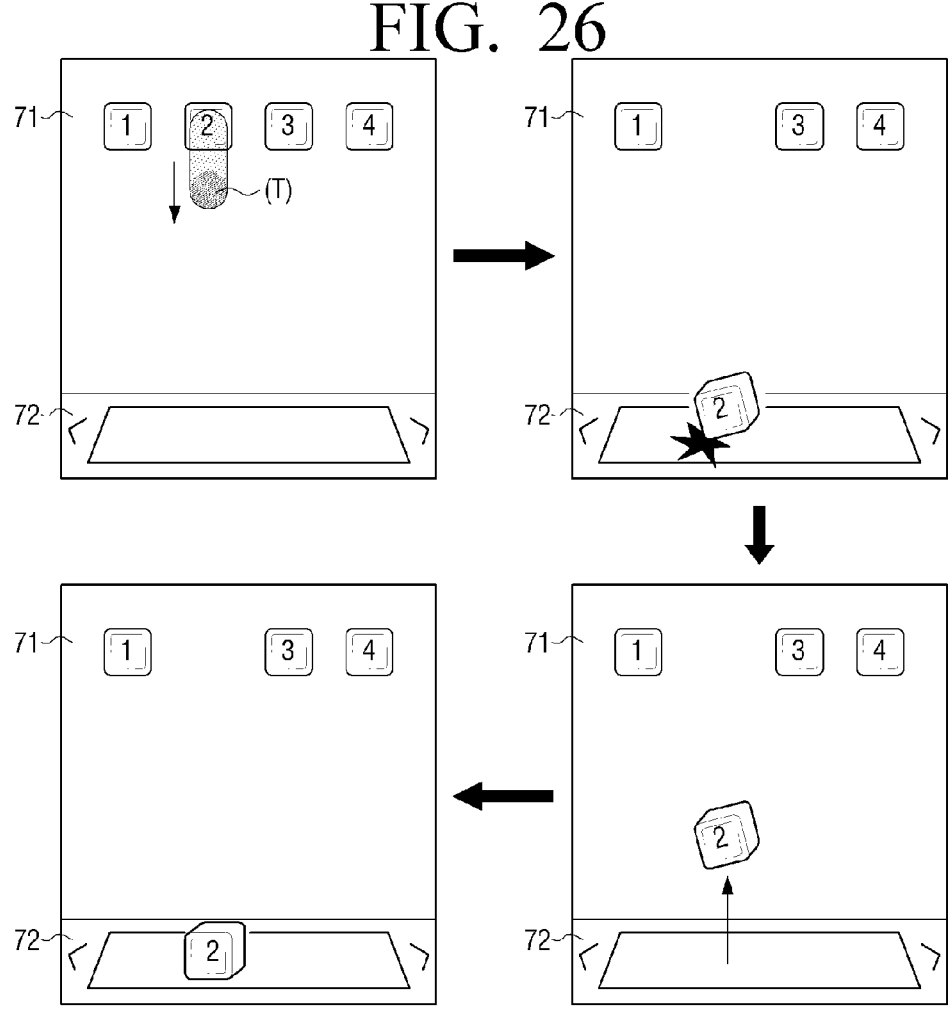
FIG. 26 is a view illustrating a process of collecting icons having a rigid property.

FIG. 26 is a view provided to explain a process in which icons with rigidity drop into the collecting area. Referring to FIG. 26, icon #2 displayed in the icon display area 71 within the interaction image falls into the collecting area 72 in response to the touch inputted by the user.

If the icon falling in the Y-direction collides against the bottom of the collecting area 72, the control unit 130 controls so that the icon bounces back in Y+ direction and then gets down to the bottom. The frequency of bouncing and distance may vary depending on resiliency or rigidity of the icon.

Although the example illustrated in FIG. 26 represents a situation in which an icon bounds back upon colliding and the bottom remains as is, in another exemplary embodiment, the bottom may break as the icon with rigidity collides thereto, or the icon may be displayed as being stuck into the bottom.

Figure 27:
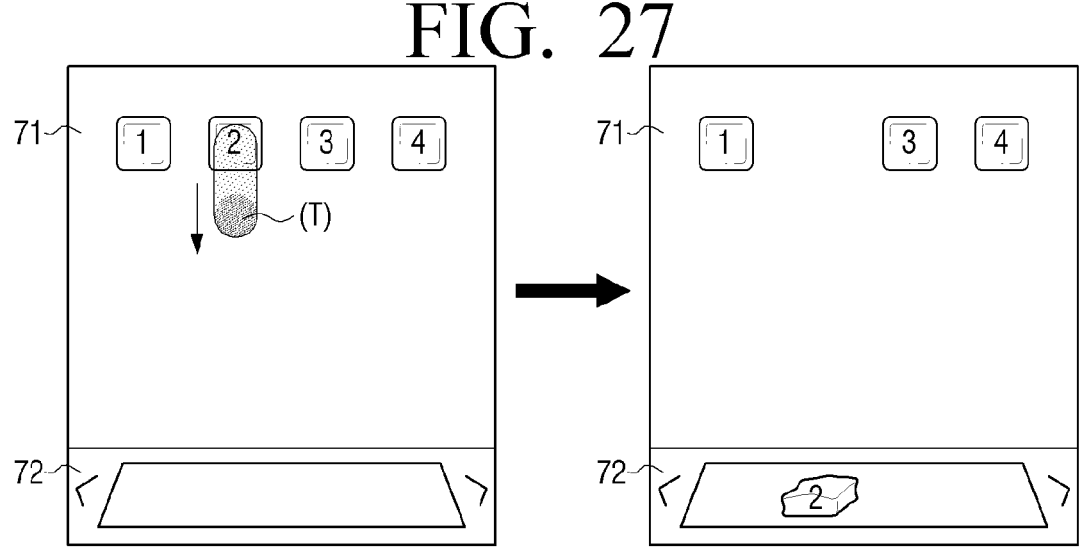
FIG. 27 is a view illustrating a process of collecting icons having a soft property.

FIG. 27 is a view provided to explain a process in which a 'soft' icon falls into the collecting area. Referring to FIG. 27, icon #2 displayed in the icon display area 71 within the interaction image drops into the collecting area 72 in response to the touch inputted by the user. The control unit 130 expresses the icon #2 in crumpled state as the icon #2 collides against the bottom of the collecting area 72. Although the icon #2 is displayed as being stuck to the bottom of the collecting area 72 in FIG. 27, in another exemplary embodiment, the icon #2 may be expressed as a rather lighter object such as aluminum can in which case the icon #2 may bound back several times until settles down in the collecting area 72.

Recovery force may also be set when the rigidity or softness is set. The 'recovery force' refers to an ability to recover to original state after the icon is crumpled due to collision. If the recover force is set to 0, the icon will not recover its original shape and maintains the crumpled state, while if the recovery force is set to the maximum, the icon will recover to the original state within the shortest time upon crumpling.

The attribute of the icon may be set by the user directly who may set the attribute for an individual icon. Alternatively, the attribute of the icon may be set and provided by the provider of the application or content corresponding to the icon.

If the attribute of the icon is set by the user, in response to the user's setting command as inputted, the control unit 130 may display a user setting screen.

Figure 28:
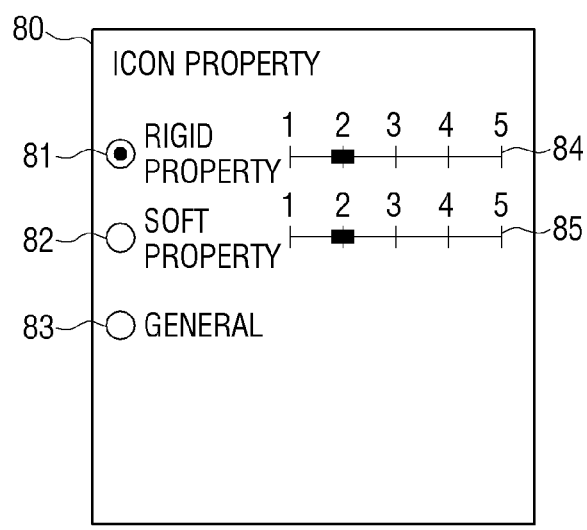
FIG. 28 is a view illustrating an example of a user setting screen for setting attributes.

FIG. 28 illustrates an example of a user setting screen. Referring to FIG. 28, the user setting screen 80 may display first to third select areas 81, 82, 83 through which the user may select one from among rigid, soft, or general attribute, and first and second level select areas 84, 85 through which the user may select rigidity level and softness level. The first or second level select area may be activated upon selecting of the first or second select areas 81, 82, and inactivated upon selecting of the other select areas.

Although not illustrated in FIG. 28, depending on exemplary embodiments, a recovery force setting area associated with a softness attribute may be additionally displayed.

Although an example of FIG. 28 illustrates that the rigidity or softness may be selected through separate select areas from each other, in another exemplary embodiment, one single bar scale may replace the select areas, with constructing a user setting screen in the form to set rigid, soft or general attribute. That is, if a bar scale, which is moveable within a predetermined range, is positioned in the middle, the general attribute may be set, and with reference to the middle line, a rigid attribute may be set if the bar moves to the right, or a soft attribute may be set if the bar moves to the left. As explained above, the user setting screen may be implemented in various configurations.

The control unit 130 may store the attribute information as set through the user setting screen into the storage unit 140 and apply the attribute information to the respective icons during initialization of the display apparatus 100 to adjust the display state of the icons according to the attribute information.

Although the rigid and soft attributes are explained as an example above with reference to FIG. 28, one will understand that the attribute of the icon may also include initial location, weight, frictional force, recovery force, or the like. Accordingly, the other various attributes may be appropriately defined by the user or manufacturer to be used. For example, if the initial location is defined, an icon on the interaction image may be displayed at an initial location defined therefor. If the weight is defined, icons may be expressed as being exerted by different forces with respect to the bottom of the collecting area or to the other icons in proportion to the weight thereof. If frictional force is defined, icons colliding against the bottom or the other icons may be expressed as being slid differently depending on the frictional forces thereof.

Not only the attribute, but also the spatial attribute of the interaction image may also be set. The spatial attribute may include gravity or magnetic force. For example, if gravity is defined, as explained above in several embodiments, the icons may fall into the collecting area in different velocities due to gravity. If the magnetic force is defined, the collecting area may be expressed as a magnet, and the icons may be expressed as being drawn into the collecting area due to the magnetic force.

As explained above, various icon attributes and spatial attributes may be defined and taken into consideration when the interaction image is varied.

Meanwhile, although the exemplary embodiments explained above illustrate that only the icons are displayed in the icon display area 71, one will understand that additional information such as text or symbols may also be displayed to indicate that the respective icons may fall into the collecting area 72 when there is user's touch input or other manipulations.

Figure 29:
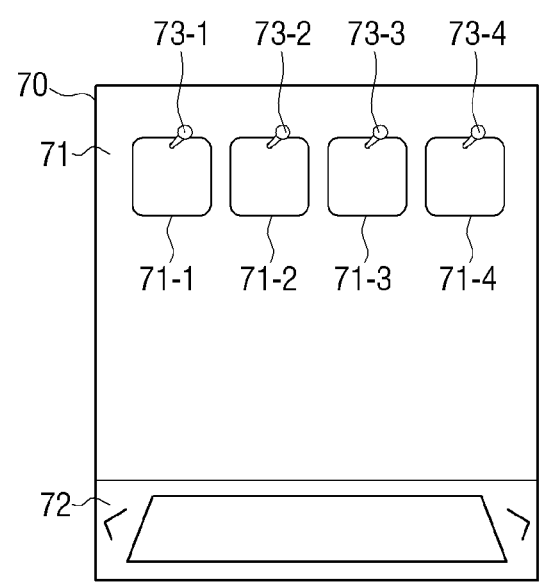
FIG. 29 is a view illustrating a modified example of icon displayed on an icon display area.

FIG. 29 is a view provided to explain another example of an icon displayed in the icon display area. Referring to FIG. 29, the respective icons 71-1, 71-2, 71-3, 71-4 displayed in the icon display area 71 may be expressed as being retained at a retaining portion 73-1, 73-2, 73-3, 73-4 which may be expressed in the form of nail, or the like. If shaking of the display apparatus 100 is detected, the control unit 130 may display so that the respective icons 71-1, 71-2, 71-3, 71-4 dangle on the retaining portions 73-1, 73-2, 73-3, and 73-4 according to the shaking. From the icons 71-1, 71-2, 71-3, 71-4 dangling, the user intuitively understands that the icons can fall onto the bottom if he or she touches the same.

Meanwhile, as explained above, the icons may be expressed in varying shapes on the interaction image, and transferred by the user and displayed in the collecting area 72. The user may edit the icons that fall into the collecting area 72.

To be specific, in response to the user's command to edit the collecting area, the control unit 130 may edit the icons collected in the collecting area in accordance with the user's command. The editing may include various jobs such as, for example, page change, copy, deletion, color change, shape change, size change, or the like. Depending on the user's choice, the control unit 130 may perform editing separately for the individual icons or collectively for a group of icons. In the editing process according to the exemplary embodiment explained with reference to FIG. 18, the user selects one icon and moves it to another page. The other editing processes will be explained below.

Figure 30:
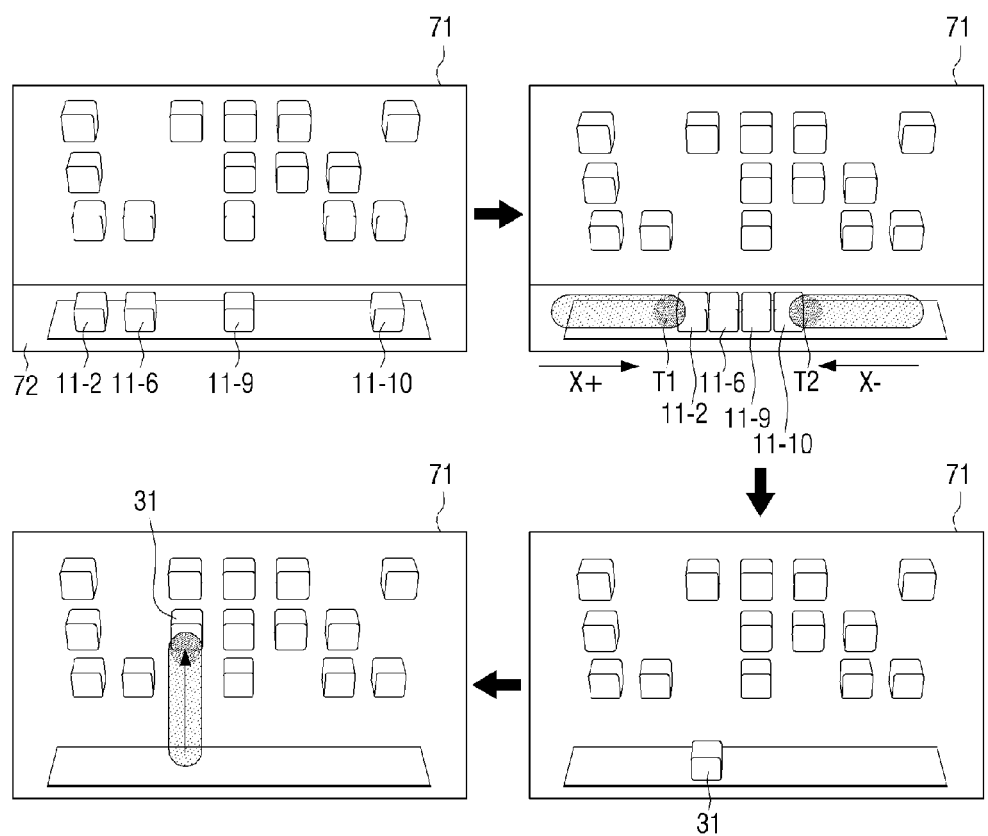
FIG. 30 is a view illustrating an example of a process of grouping and editing a plurality of icons.

FIG. 30 illustrates a manner of collectively editing a group of a plurality of icons. Referring to FIG. 30, a plurality of icons 11-2, 11-6, 11-9, 11-10 fall into the collecting area 72 from among the icons displayed in the icon display area 71. At this state, the user may group the respective icons 11-2, 11-6, 11-9, and 11-10 by gesturing to collect the icons. FIG. 30 particularly illustrates a gesture to collect the icons in the form in which the user touches on the collecting area with two fingertips and move his or her fingertips to X+ and X− directions, respectively. However, this is explained only for illustrative purpose, and other examples may be implemented. For example, a long-touch on the collecting area, or touching for a predetermined number of times, selecting a separately-provided button or menu, or covering the front of the collecting area with a palm, may also be implemented as a gesture directing to collect icons. Further, although all the icons 11-2, 11-6, 11-9, 11-10 displayed on the collecting area 72 are grouped in the exemplary embodiment explained with reference to FIG. 23, the user may also group only some of the icons by making gestures to collect the icons.

In response to the gesture to collect the icons as inputted, referring to FIG. 30, the respective icons 11-2, 11-6, 11-9, and 11-10 are displayed as one integrated icon 31. If the user touches the integrated icon 31 and moves it to the icon display area 71, the integrated icon 31 is moved to the page displayed on the icon display area 71 and displayed thereon. The integrated icon 31 may remain in its shape on the changed page, unless a separate user command is inputted. If the user touches the integrated icon 31, the integrated icon shape is disintegrated, so that the respective grouped icons of the integrated icon 31 are displayed in the corresponding page.

Figure 31:
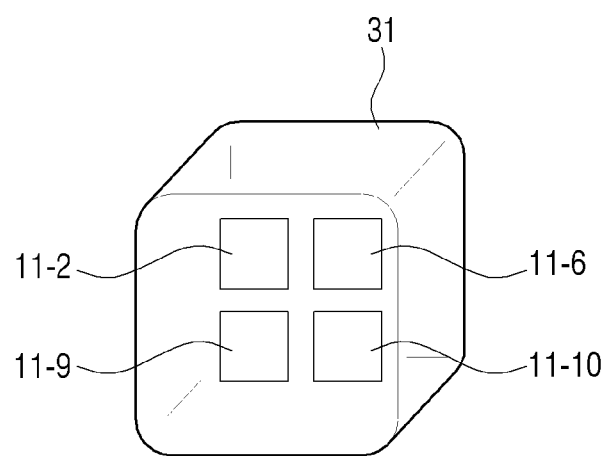
FIG. 31 is a view illustrating an example of an integrated icon including a group of a plurality of icons.

The shape of the integrated icon 31 may vary depending on exemplary embodiments. FIG. 31 illustrates an example of the shape of the integrated icon.

Referring to FIG. 31, the integrated icon 31 may be expressed as including reduced images of the respective icons 11-2, 11-6, 11-9, and 11-10. The integrated icon 31 is expressed as a hexahedron in FIG. 31, but in another exemplary embodiment, the icon 31 may be expressed as a 2D image. Further, if there are too many integrated icons to be entirely displayed in reduced forms on the integrated icon 31, reduced images of some icons may be displayed, or the size of the integrated icon 31 may be enlarged to display all the reduced images of the icons.

Alternatively, i.e., unlike the example illustrated in FIG. 31, the integrated icon 31 may be expressed in the same form as one of the grouped icons 11-2, 11-6, 11-9, 11-10, with a numeral displayed on one side, indicating the number of icons represented therein.

The user may collectively edit the icons by inputting various edit commands with respect to the integrated icon 31. That is, referring to FIG. 30, the user may collectively transfer the icons to another page, delete the icons, or change the attributes of the icons such as shape or size. The user may input a command to delete or change an attribute by selecting buttons separately provided on the display apparatus 100 or selecting a menu displayed on the screen.

Figure 32:
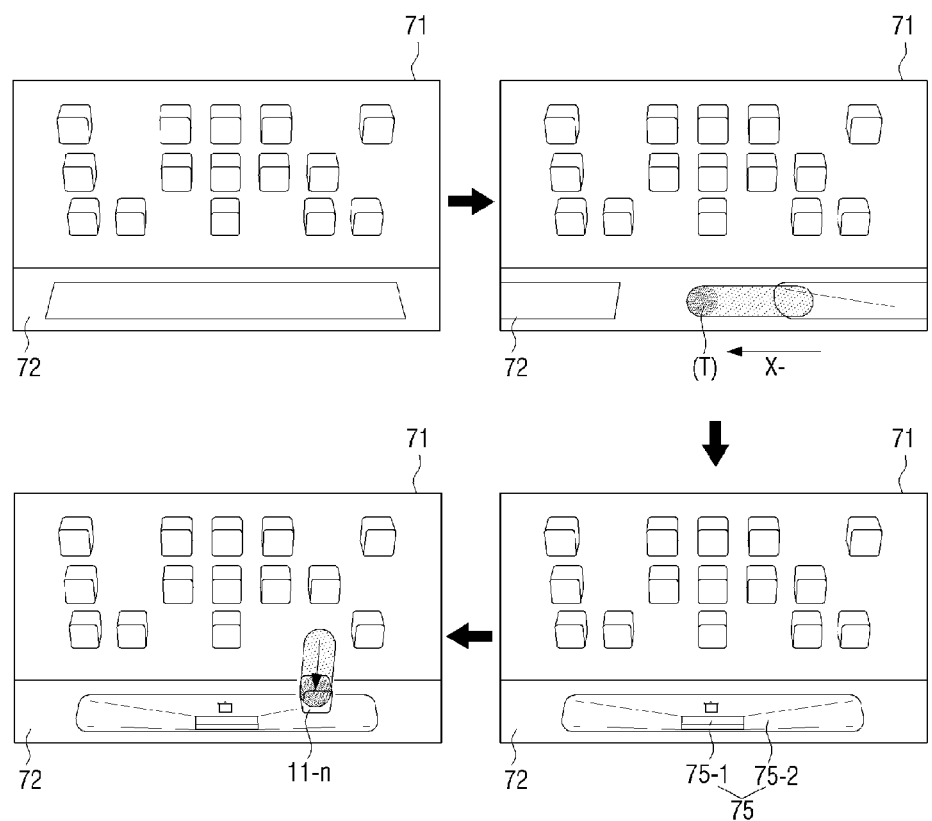
FIGS. 32 and 33 are views provided to explain a display method for deleting icons according to various embodiments.
Figure 33:
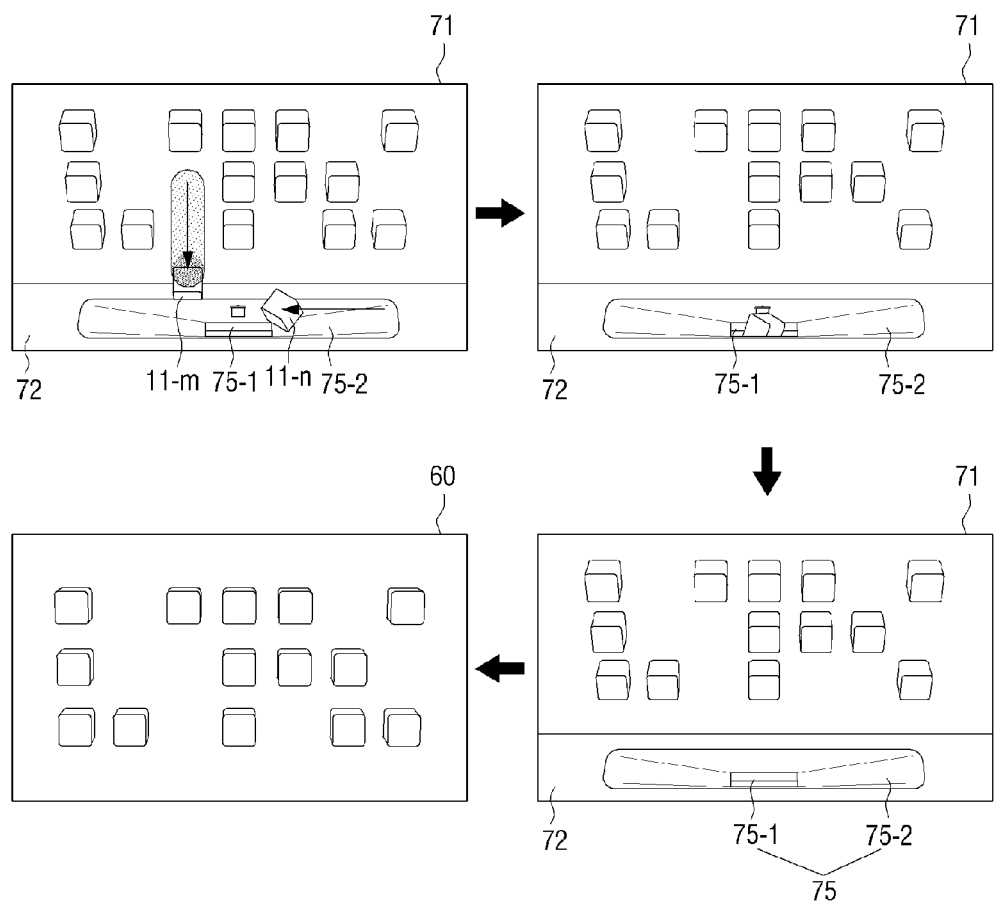

FIGS. 32 and 33 are views provided to explain an example of a method for deleting an icon.

Referring to FIG. 32, an interaction image, including the icon display area 71 and the collecting area 72, is displayed. As the user manipulates inputs to change the collecting area 72, the control unit 130 changes the collecting area 72 to a deleting area 75 while maintaining the icon display area 71 as is.

Although an exemplary embodiment illustrated in FIG. 32 describes that the collecting area 72 is changed to the deleting area 75 in response to a touching on the collecting area 72 and moving in X− direction, if the deleting area 75 is on the left side to the collecting area 72, the collecting area 72 may be changed to the deleting area 75 in response to a manipulation to move in X+ direction. Alternatively, the collecting area 72 may be changed to the deleting area 75 in response to button or menu selecting, voice, motion input, or the like, in addition to the touch input.

The deleting area 75 may include a hole 75-1 to delete an icon, and a guide area 75-2 formed around the hole 75-1. The guide area 75-2 may be formed concavely to the direction of the hole 75-1.

If an icon 11-n on the icon display area 71 is touched in a state that the deleting area 75 is displayed, the control unit 130 changes the interaction image to express the physical interaction of the icon 11-n which is dropped downward.

Referring to FIG. 33, the icon dropped into the guide area 75-2 may roll into the hole 75-1 along the inclining of the guide area 75-2. Then if another icon 11-m is touched in this state, the control unit 130 constructs the interaction image so that the touched icon 11-m collides against the guide area 75-2 and then roll into the hole 75-1. The control unit 130 may delete the icon in the hole 75-1 from the corresponding page.

If the edit mode finishes in this state, the control unit 130 may change to a normal screen 60 from which the corresponding icons 11-n, 11-m are removed, and display the result.

FIGS. 32 and 33 illustrate an example where the deleting area 75 including the hole 75-1 and the guide area 75-2 is displayed. However, the deleting area 75 may be implemented in various configurations.

Figure 34:
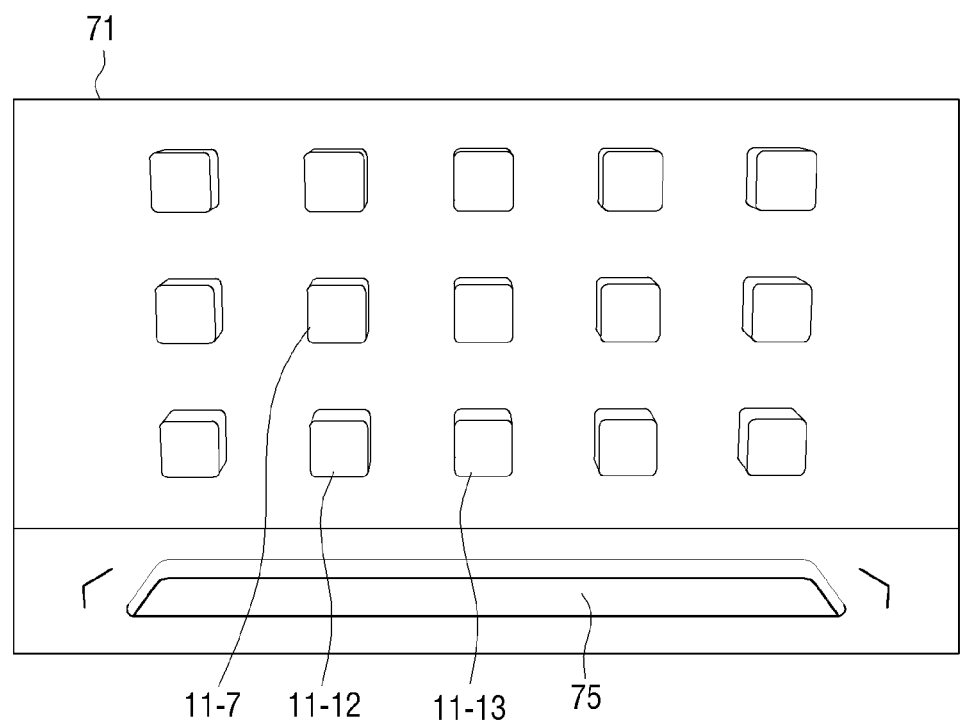
FIG. 34 is a flowchart provided to explain a display method according to another exemplary embodiment.
Figure 35:
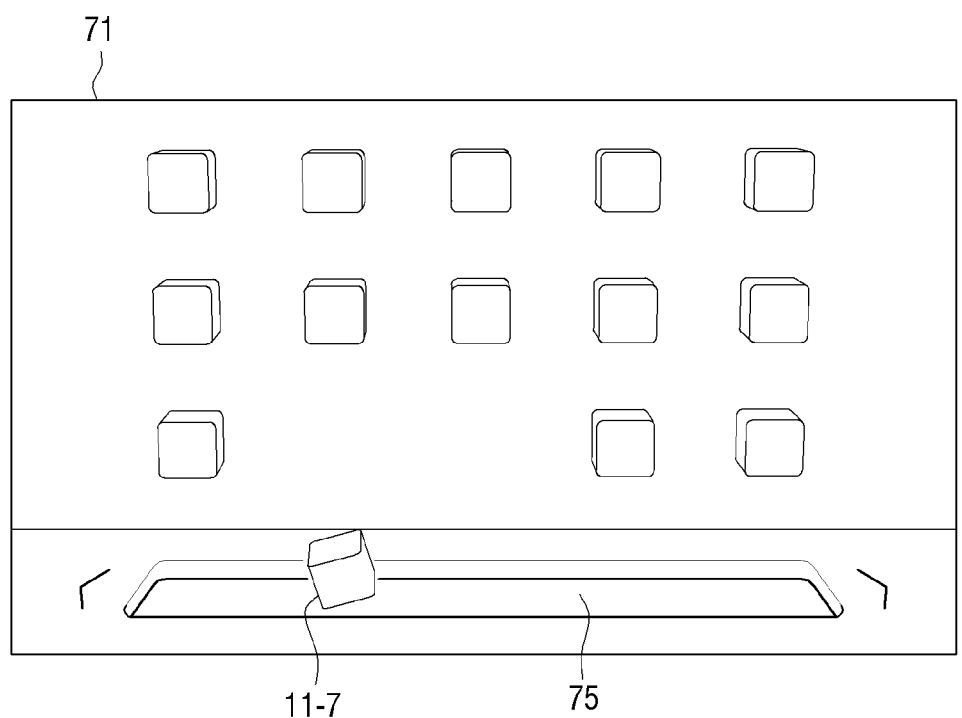
FIG. 35 is a view illustrating yet another example of an interaction image.

FIGS. 34 and 35 illustrate another example of the deleting area 75. Referring to FIG. 34, the deleting area 75 may be implemented to include one big hole only. Accordingly, referring to FIG. 35, the icons 11-7, 11-12, 11-13 are directly dropped into the deleting area 75 and deleted in response to the user's touch input.

Meanwhile, referring to FIGS. 21 to 24, in a state that at least one icon is collected in the collecting area 72, in response to a user command to change the collecting area 72 to the deleting area 75, the at least one icon collected in the collecting area 72 may be collectively moved to the deleting area 75 to be deleted. Accordingly, collective deleting of the icons is enabled.

Although the exemplary embodiment illustrated in FIGS. 32 to 35 explain that the deletion is performed in a state that the collecting area 72 is changed to the deleting area 75, in another exemplary embodiment, the control unit 130 may display both the deleting area 75 and the collecting area 72 together. That is, the control unit 130 may control the graphic processing unit 137 to construct the interaction image in which a hole for deletion is provided on one side of the collecting area 72. In this example, an icon touched by the user may first fall into the collecting area 72 and then may be deleted as the user pushes the icon collected in the collecting area 72 to the hole.

Additionally, it is possible to change the collecting area 72 to an editing area (not illustrated) to collectively change the attributes of the icons collected in the collecting area 72 to have predetermined attributes corresponding to the corresponding editing area. By way of example, the icon moved to the size reducing area may be reduced in size, while the icon moved to the size enlarging area may be increased in size. If one editing area includes a plurality of attribute change areas such as size change area, color change area, or shape change area, the user may change the attributes of the icon by pushing the icon to the intended area.

As explained above in various exemplary embodiments, in response to a user's touch input made with respect to the interaction image, the display apparatus 100 may drop the icon into the collecting area and edit the icon in the collecting area in various manners. Unlike the conventional example where the user has to select each icon from each page and move it to the intended page to move the icons distributed over a plurality of pages, an exemplary embodiment provides improved convenience by providing a collecting area which enables convenient editing of icons. The exemplary embodiment also changes an interaction image to move in compliance with real-life laws of physics such as gravity or magnetic force instead of conventional standardized animation effect. Accordingly, the user is able to edit the icons as if he or she is controlling real-life objects.

Although exemplary embodiments have been explained so far with respect to icons, not only the background image includes the icons, but also an application executing screen, content playback screen or a various list screen may also be implemented. Accordingly, the processing explained above may be implemented for not only icons, but also various other objects such as text, image or pictures.

Figure 36:
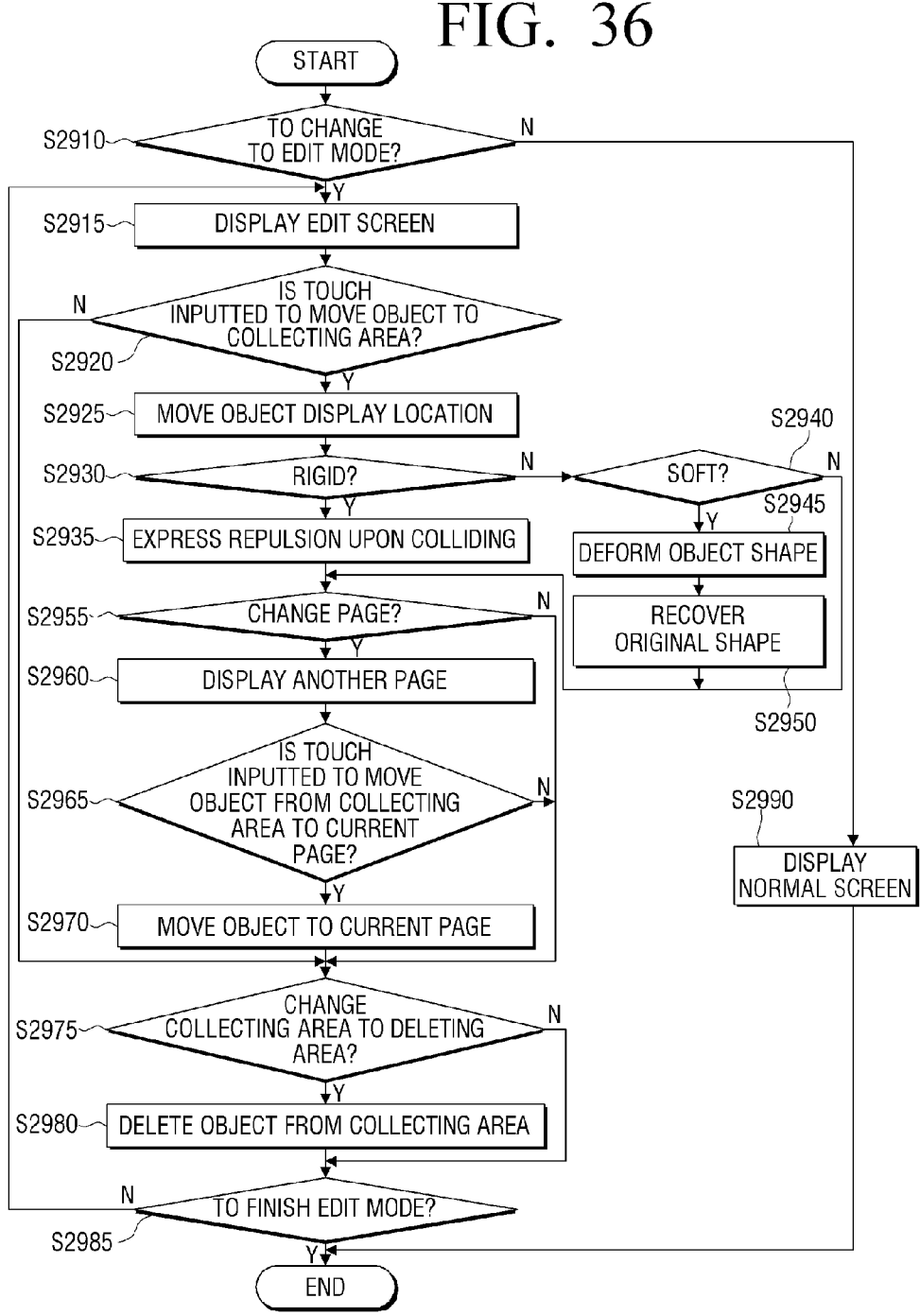
FIG. 36 is a view illustrating a method for performing an unlock operation on the interaction image of FIG. 35.

FIG. 36 is a flowchart provided to comprehensively explain a display operation according to the various exemplary embodiments explained above.

Referring to FIG. 36, at S2990, the display apparatus 100 operating in normal mode displays a normal screen. At S2910, if the normal mode is changed to edit mode, at S2915, the editing screen is displayed. The editing screen may display various types of objects including icons, and also the collecting area to collect these objects.

At S2920, in response to a touch manipulation to transfer an object on the editing screen to the collecting area, at S2925, the location to display the object is moved to the direction of the collecting area.

At S2935, if the object has a rigid property, the interaction image is changed to express the repulsive action of the object upon colliding against the bottom of the collecting area. On the contrary, at S2940, if the object has soft property, at S2945, the shape of the object changes as if it crumples upon colliding against the bottom. At S2950, the shape of the object returns to the original shape over a predetermined time.

If the object has general property (i.e., neither rigid, nor soft), the object is moved into the collecting area without expressing a specific effect.

At S2955, if the page is changed, at S2960, another page is displayed. At this time, the collecting area is maintained. At S2965, if a touch manipulation is inputted directing to move the object in the collecting area to the current page, at S2970, the display apparatus 100 moves the displayed object to the current page.

Meanwhile, at S2975, if a manipulation is inputted, directing to change the collecting area to the deleting area, at S2980, the operation is performed to delete the object of the collecting area.

The operations explained above continue in the edit mode. At S2985, if the edit mode finishes, the operation returns to normal mode.

Although the process such as moving an object and deleting the same has been explained so far with reference to FIG. 36, the process may additionally include grouping the objects to collectively move, copy or edit the grouped edits.

As explained above, since physical interaction is expressed in the interaction image during selecting or editing of an object in response to the user's manipulation, the user is provided with real-life experience. That is, since the status of the object is calculated and sensitively displayed on a real-time basis instead of via a standardized animation effect, satisfaction in manipulating the apparatus increases.

Meanwhile, the interaction image may be implemented as a locked screen. On the locked screen, icons to execute an application or function do not appear, but only an unlock icon is displayed.

Figure 37:
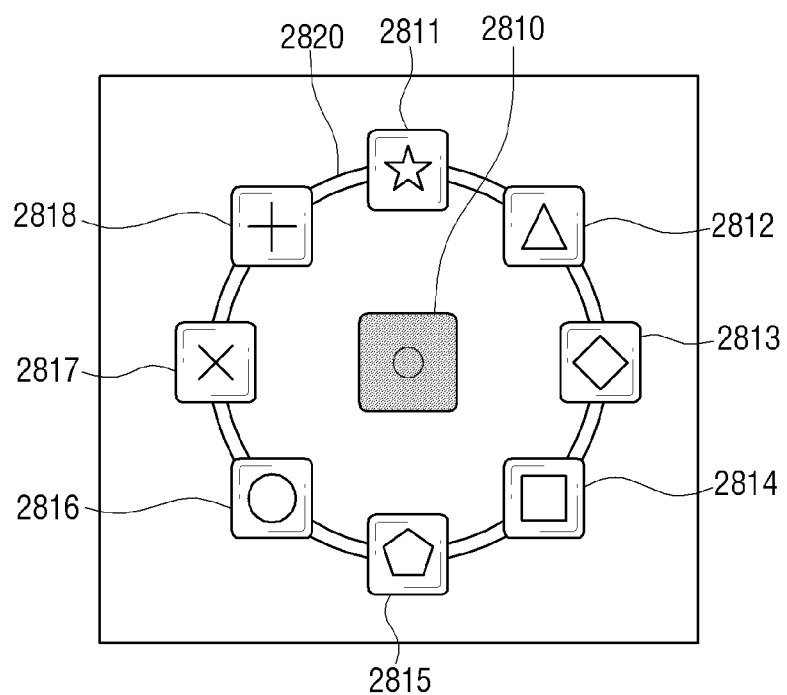
FIGS. 37 and 38 are views provided to explain various methods to express physical interactions on the interaction image of FIG. 35.

FIG. 37 is a view provided to explain an example of the interaction image implemented as a locked screen. The locked screen, similar to the one illustrated in FIG. 37, may appear when the user selects a specific button on the display apparatus 100 which is in locked mode for non-use of the display apparatus 100 longer than a predetermined time.

Referring to FIG. 37, the locked screen 2800 may display a control icon 2810 and a plurality of symbol icons 2811 to 2818. Referring to FIG. 37, the respective symbol icons 2811 to 2818 may be arranged in a circular pattern around the outer side of the control icon 2810 and connected to each other by a connecting line 2820. However, the number, location and arrangement of the symbol icons 2811 to 2818 are not limited to the example of FIG. 37 only, and may vary depending on exemplary embodiments.

The user may touch on the control icon 2810 and move the icon 2810 to a predetermined direction. That is, if detecting a touch on the control icon 2810 and the touched point is moved, the control unit 130 moves the location to display the control icon 2810 to the moved, touched point. If the moved control icon 2810 collides with at least one of the symbol icons 2811 to 2818, the control unit 130 perceives that the user selects the symbol icon collided by the control icon 2810. The control unit 130 may determine whether the icons collide or not by calculating a distance between the location to display the respective symbol icons 2811 to 2818 and the control icon 2810.

Figure 38:
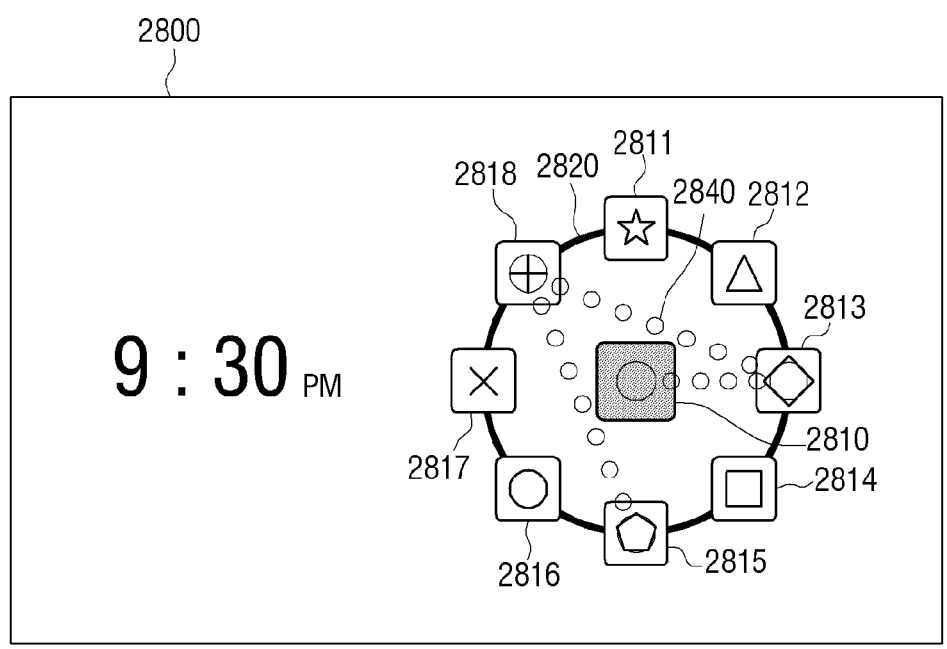

FIG. 38 is a view provided to explain a process of moving the control icon 2810 according to the user's manipulation. Referring to FIG. 38, the user touches on the control icon 2810 and touches the third, eighth, and fifth symbol icons

2813, 2818, 2815 in sequence. In this case, the control unit 130 may display the path of movement of the control icon 2810.

The control unit 130 performs an unlock operation, if an order of selecting at least one from among the plurality of symbol icons 2811 to 2818 matches, i.e., if an order of colliding between the symbol icon and the control icon matches a preset pattern. The user may preset unlock pattern information including a symbol icon required to select and an order of selecting the same, and change the information frequently as need arises. If the unlock pattern information is changed, the control unit 130 may store the changed unlock pattern information to the storage unit 140.

Meanwhile, although the symbol icon collided with the control icon 2810 shows no particular change in FIG. 38, in another exemplary embodiment, the interaction image may change a display status so that the physical interaction of the symbol icon is displayed in response to the collision.

Figure 39:
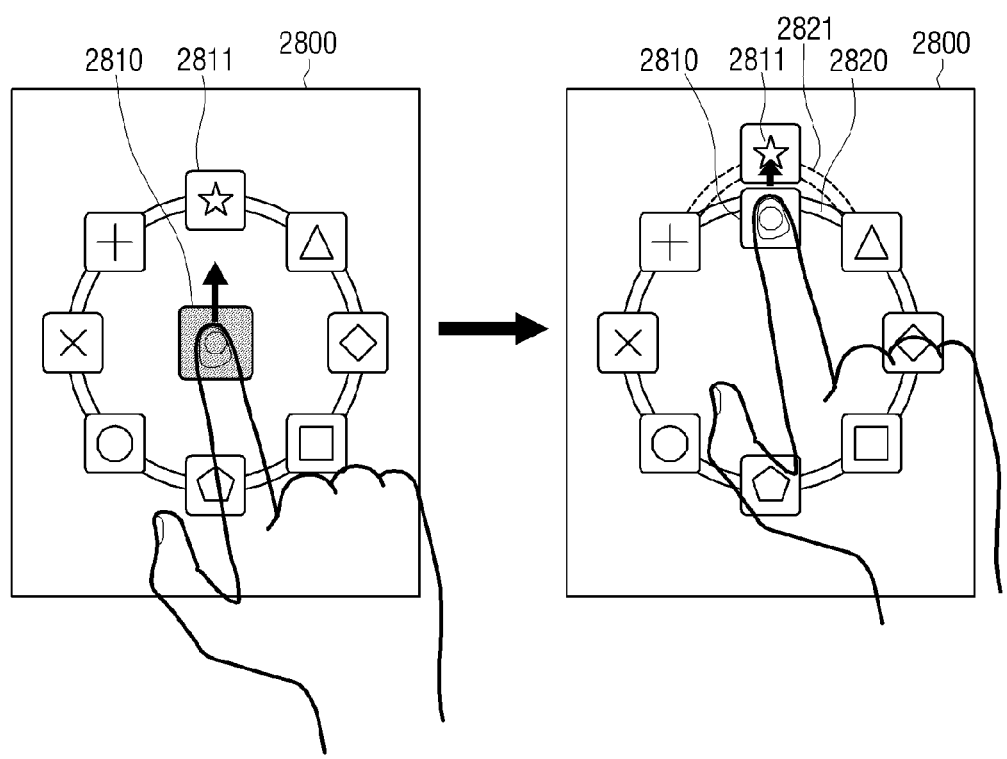
FIGS. 39 to 44 are views provided to explain another example of a method for performing an unlock operation on the interaction image of FIG. 35.

FIG. 39 illustrates an example of an interaction image which expresses physical interaction of a symbol icon. Referring to FIG. 39, the control unit 130 may display the symbol icon 2811 colliding with the control icon 2810 which is being pushed. The control unit 130 may determine whether the icons collide or not by calculating a distance between a location to display the control icon 2810 and a location to display a symbol icon 2811. Further, it is possible to determine a distance and direction of the symbol icon 2811 being pushed back based on the velocity and direction of moving the control icon 2810.

Meanwhile, as explained above, the control icon 2810 and the symbol icons 2811 to 2818 may be set to have rigid or soft property. By way of example, if the symbol icons 2811 to 2818 are set to have soft property, the symbol icons 2811 to 2818 may change forms when colliding with the control icon 2810. On the contrary, if the symbol icons 2811 to 2818 are set to have rigid property with strong repulsive force, the symbol icons 2811 to 2818 may be pushed back relatively a far distance upon colliding with the control icon 2810. The control icon 2810 may also have rigid or soft property, and its form may change when colliding depending on the property. The control unit 130 may calculate degree of deformation, or distance of pushing by the collision, or the like based on the attributes of the icons and the magnitude of the collision, and control the graphic processing unit 137 to generate a rendering screen to express the physical interaction in accordance with the calculated result.

The control unit 130 may move the symbol icon 2811 to a distance corresponding to the exerted force when the symbol icon 2811 is collided with the control icon 2810 and then return the symbol icon 2811 back to the original position. At this time, separately from the connect line 2820 which connects the symbol icon 2811 in its original position, an additional connect line 2821 may be displayed to connect the symbol icon 2811 at the moved position. When the icon returns to the original position, the connect line 2820 may resiliently bounce until the connect line 2820 returns to the original position.

Figure 40:
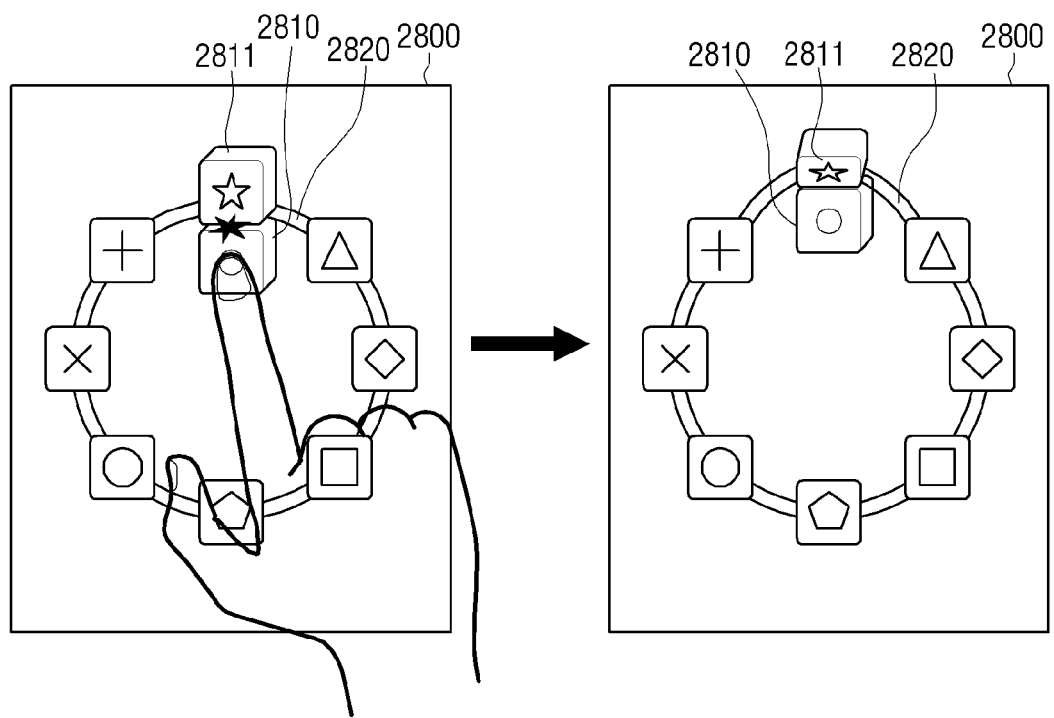

FIG. 40 illustrates another example of the interaction image which expresses physical interaction of a symbol icon. Referring to FIG. 40, the control unit 130 controls so that part of the respective symbol icons 2811 to 2818 are fixed by the connect line 2820. For example, the symbol icons 2811 to 2818 may be expressed as being threaded on the connect line. In this state, if the respective symbol icons 2811 to 2818 collide with the control icon 2810, the control unit 130 may express this as if the colliding symbol icon 2811 dangles on the connect line 2820.

Although FIGS. 38 to 40 illustrate an example where the control icon 2810 itself is moved, the control icon 2810 may be expressed in a different configuration.

FIGS. 41 to 44 illustrate an example of an interaction image according to exemplary embodiment different from the exemplary embodiment illustrated in FIGS. 38 to 40.

Figure 41:
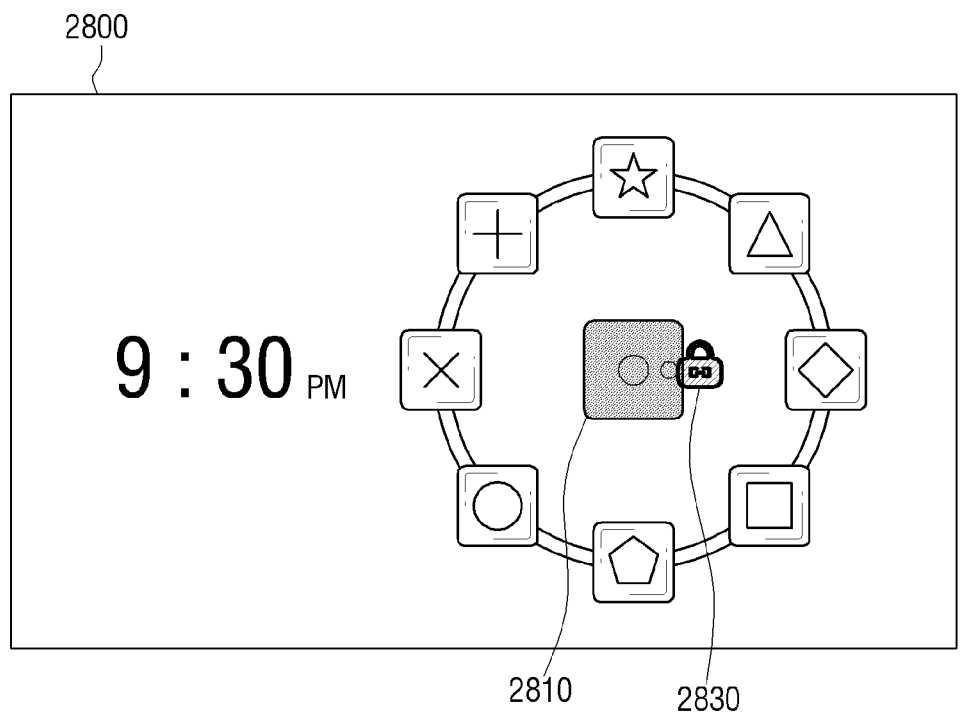

Referring to FIG. 41, it is possible to display the mark 2830 corresponding to the control icon 2810 being moved in response to the user's touch input, while the external shape of the control icon 2810 is maintained as is. If the mark 2830 collides with one of the symbol icons, the control unit 130 perceives that the corresponding symbol icon is selected. Unlike the exemplary embodiment illustrated in FIGS. 38 to 40, the exemplary embodiment of FIGS. 41 to 44 may not display the effect of the symbol icon being dangled or pushed back by the collision, when the mark 2830 collides with the symbol icon.

Figure 42:
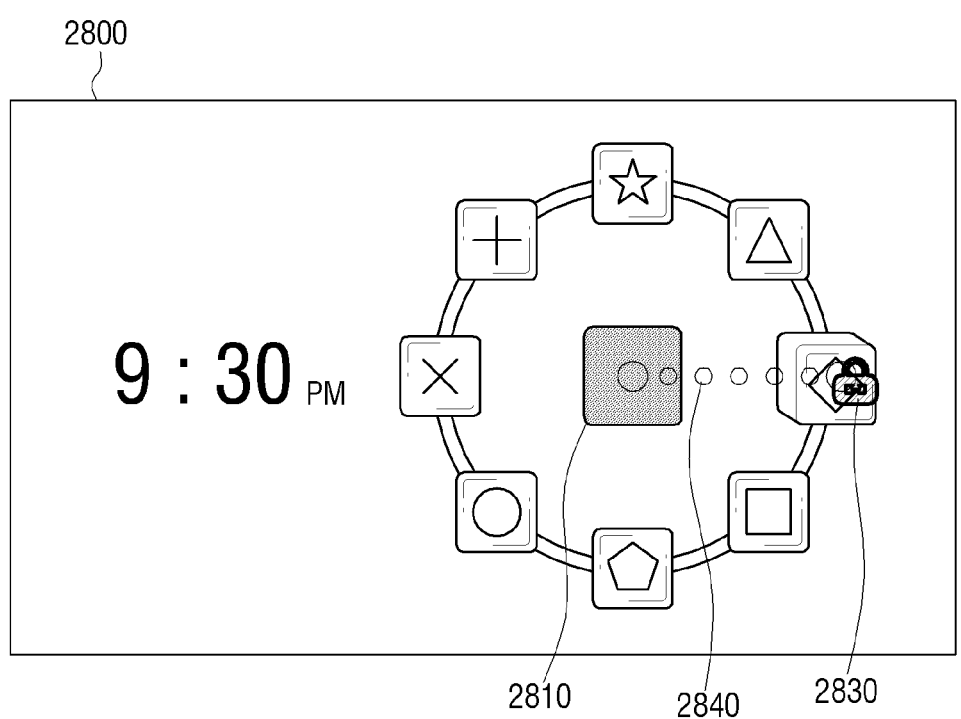

Referring to FIG. 42, a line 2840 may be displayed between the mark 2830 and the control icon 2810 to express a path of movement. When the mark 2830 collides with the symbol icon and moves to a direction of another symbol icon, the line 2840 may change direction to a new direction by using the location of the colliding symbol icon as a turning point.

Figure 43:
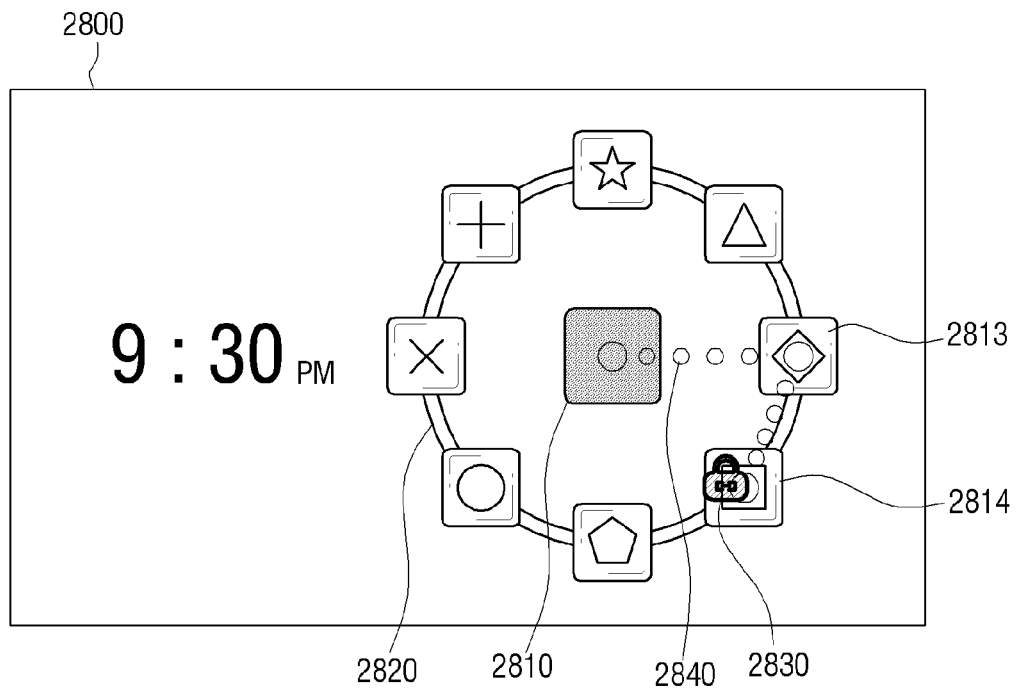
Figure 44:
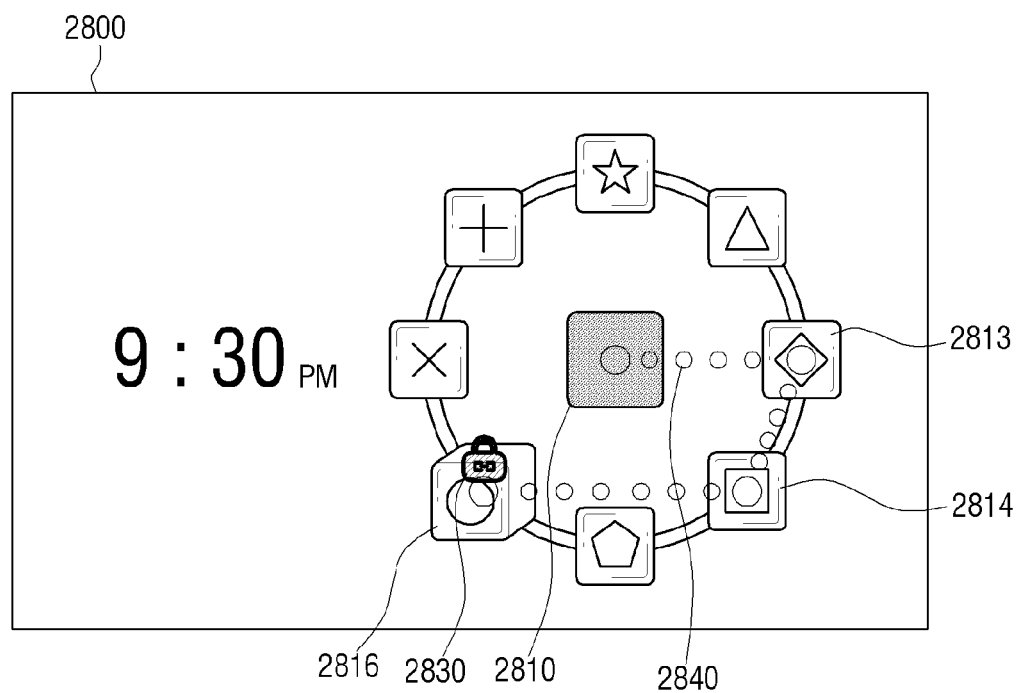

Referring to FIGS. 43 and 44, if the mark 2830 collides with the third, fourth, and sixth symbol icons 2813, 2814, 2816 in sequence, the line 2840 may be connected to the third, fourth and sixth symbol icons 2813, 2814, 2816 in sequence. The control unit 130 may perform an unlocking operation if the selected third, fourth and sixth symbol icons 2813, 2814, 2816 match the preset unlock pattern information.

In the exemplary embodiments explained above, the symbol icons may be expressed as symbols, but may be expressed in numerals, text, or pictures. Further, instead of setting the type of the selected symbol icons and order of selecting the same, the final configuration of the line 2840 representing a course of movement of the control icon or the mark may be defined. This embodiment is illustrated in FIG. 45.

Figure 45:
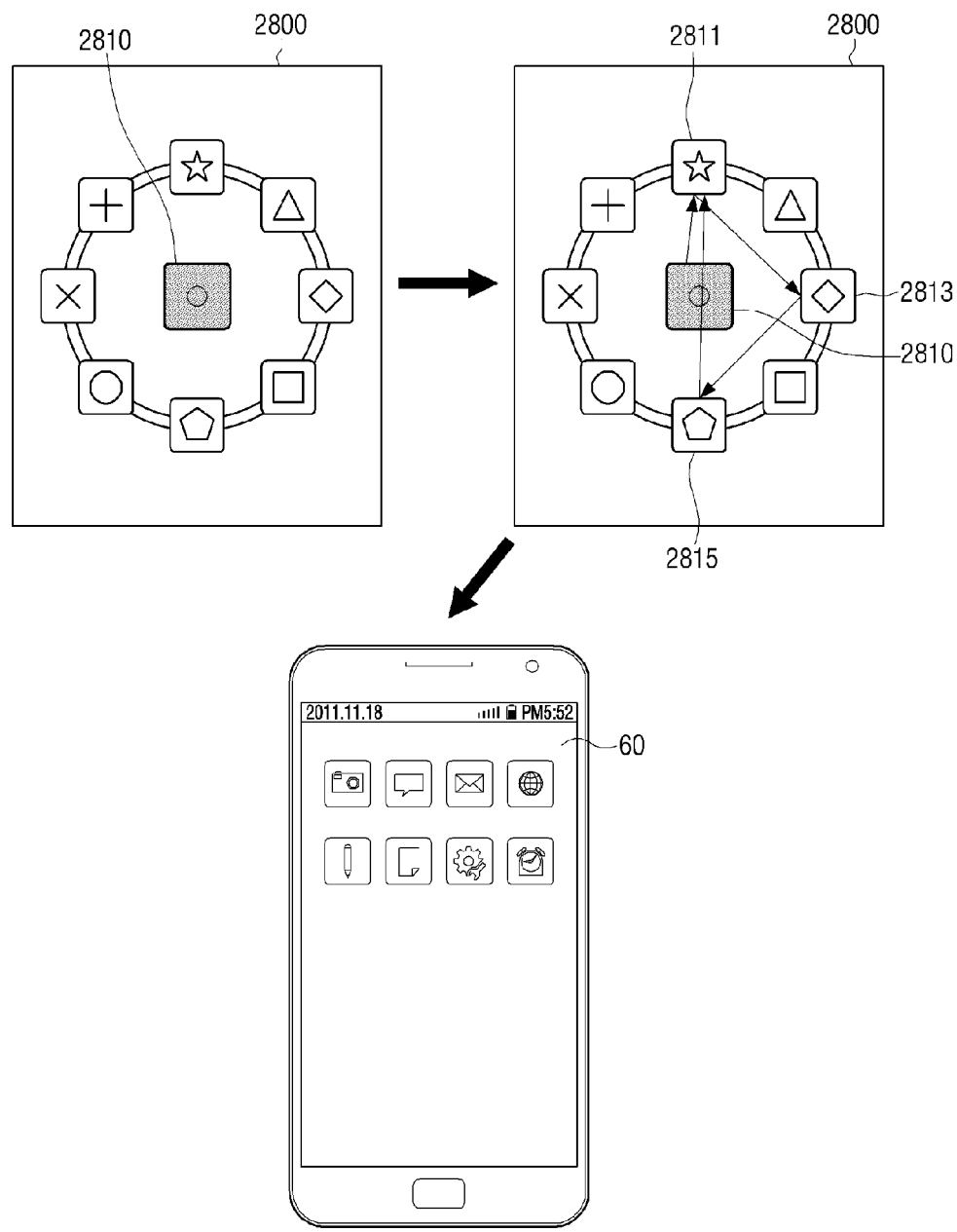
FIG. 45 is a view provided to explain another method for performing an unlock operation on the interaction image of FIG. 35.

FIG. 45 illustrates an example of a process in which an unlock screen is displayed in accordance with the unlock operation. Referring to FIG. 45, if the unlock pattern information is set as a triangle, for example, if the first, third and fifth symbol icons 2811, 2813, 2815 are selected in sequence and then the first symbol icon 2811 is lastly selected again, a triangular line is formed, connecting the first, third, and fifth symbol icons 2811, 2812, 2813. Since the triangular line corresponds to the preset unlock pattern, the control unit 130 performs an unlock operation. The control unit 130 may then display the unlocked screen. The unlocked screen may be the normal screen 60 including the icons.

A plurality of shapes may be registered as the unlock patterns, and different functions may be mapped for the respective shapes. That is, if the functions of unlocking, telephone call connecting, and mail checking operations are mapped for the triangular, rectangular and pentagonal shapes of FIG. 45, respectively, an unlock operation may be performed when three symbol icons are selected in a triangular pattern, or a screen for the telephone call connecting appears immediately along with unlocking operation, when four symbol icons are selected in a rectangular pattern. If five symbol icons are selected in a pentagonal pattern, along with the unlock operation, a main screen to check mail is displayed. As explained above, various other functions may be performed in association with the unlock operation.

Figure 46:
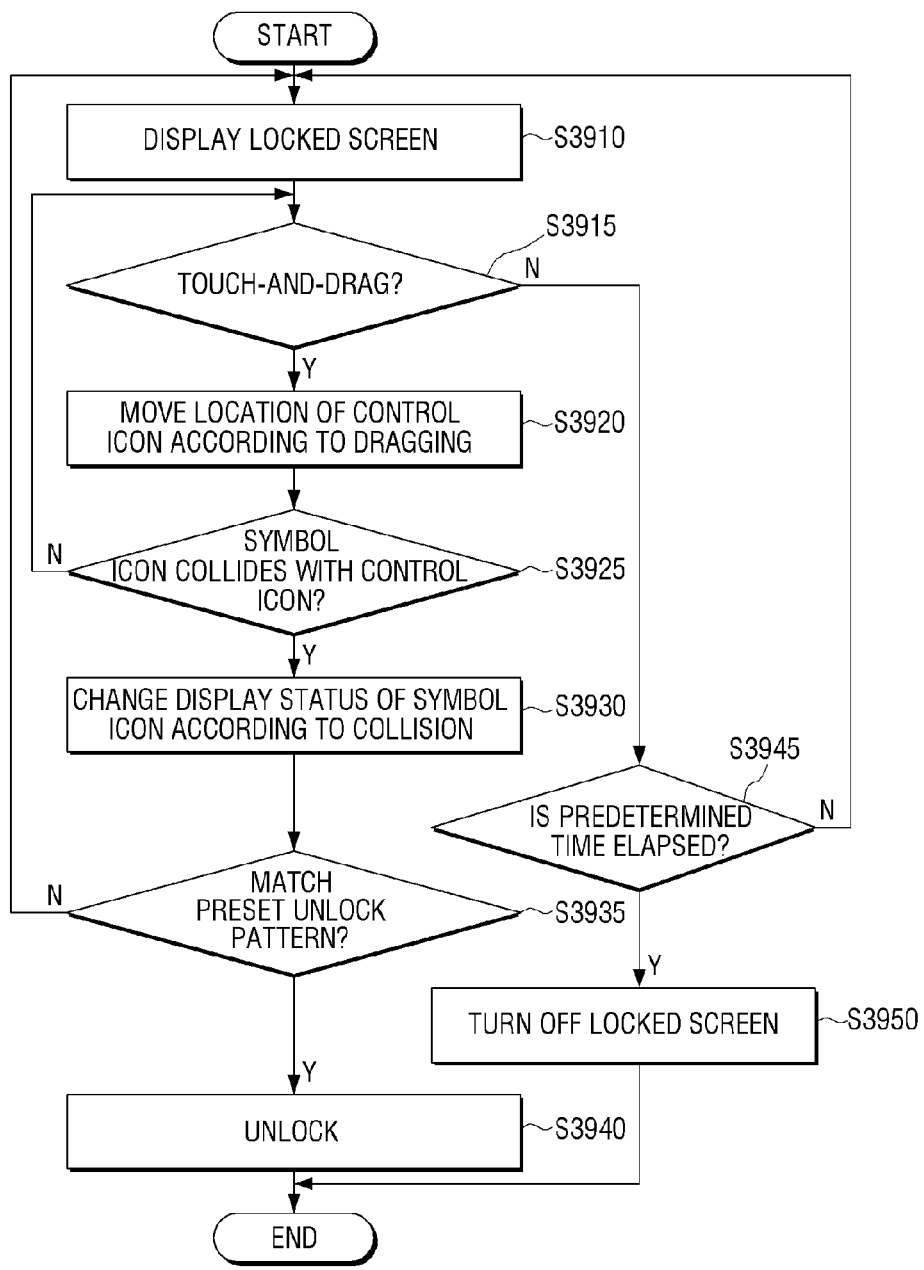
FIG. 46 is a flowchart provided to explain a display method according to another exemplary embodiment.

FIG. 46 is a flowchart provided to explain a method for unlocking when the interaction image is implemented as the unlock screen. Referring to FIG. 46, at S3910, the display apparatus 100 displays the locked screen.

At S3915, if the user touches-and-drags on the locked screen, at S3920, the location of the control icon is moved in the direction of dragging. At S3925, if determining that the control icon collides with the symbol icon based on the movement of the location of the control icon, at S3930, the display apparatus 100 changes the display status of the symbol icon according to the collision. By way of example, the symbol icon may be expressed as being pushed back from the original position or swayed. Alternatively, the symbol icon may be expressed as being crumpled.

At S3935, if determining that the pattern of selecting the symbol icons corresponds to a preset unlock pattern, at S3940, the display apparatus 100 performs an unlock operation. Meanwhile, at S3910, with the locked screen displayed, at S3915, if no further touch input is made, and at S3945, if a preset time elapses, at S3950, the locked screen is turned off.

In various exemplary embodiments explained so far, in response to the user's touch input with respect to icons or other various types of objects on the interaction image, the corresponding physical interaction is expressed on the screen.

Additionally, if a specific event occurs instead of the user's touch input, the shape of the object may vary accordingly, enabling a user to intuitively understand the status of the display apparatus.

Figure 47:
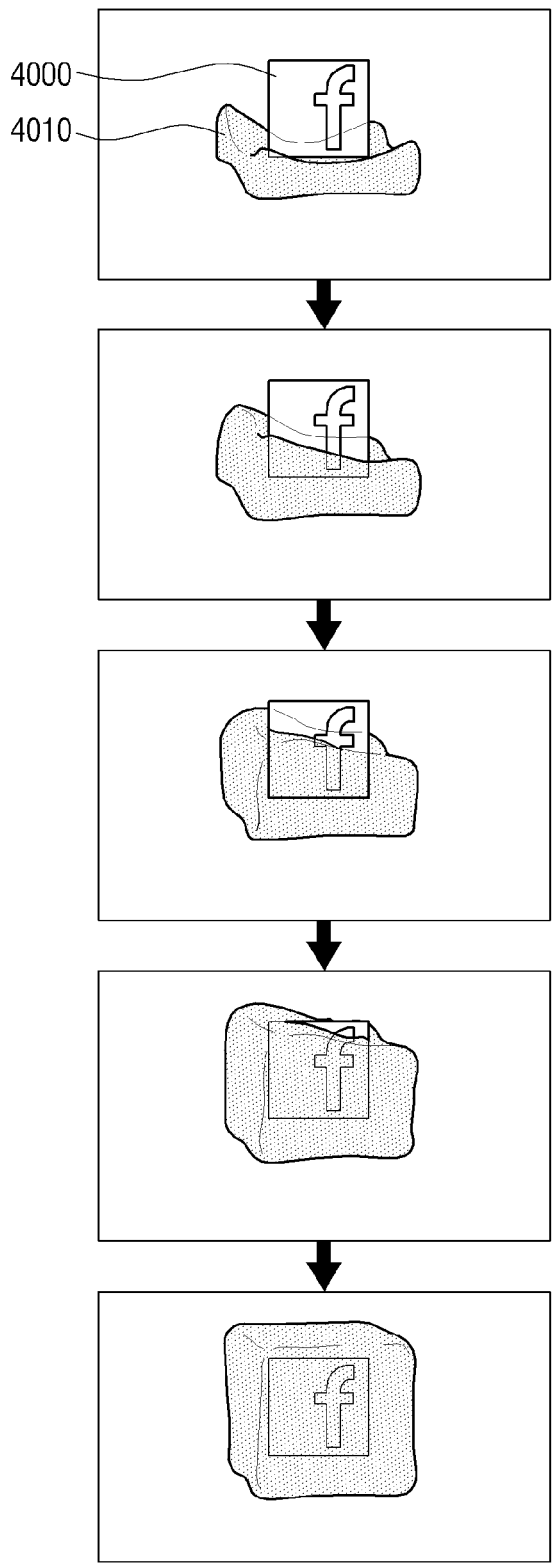
FIG. 47 is a view provided to explain a method for changing a display status of the interaction image during process of downloading an application.
Figure 48:
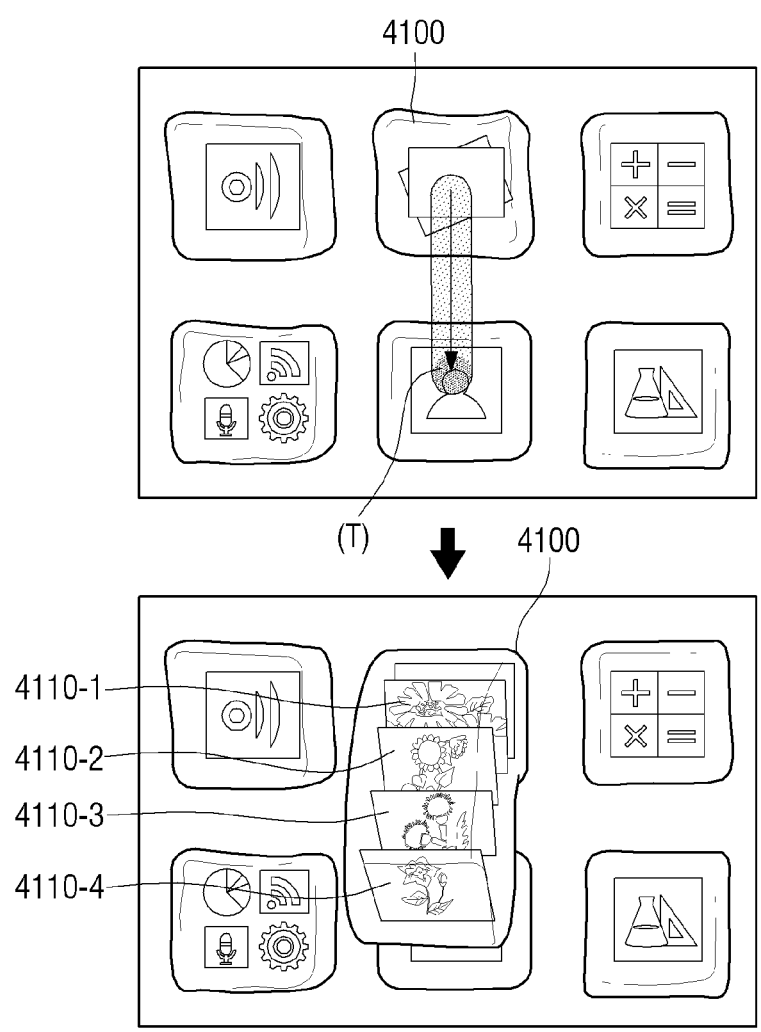
FIG. 48 is a view illustrating an example of an interaction image that provides a preview.

FIGS. 47 and 48 are views provided to explain a method for informing the status of the display apparatus by varying the shape of the object.

FIG. 47 illustrates an example of the interaction image to express an application downloading status. Referring to FIG. 47, if an application is selected and downloaded from an external server such as an application store, the display apparatus 100 may first display a basic icon 4000 of the corresponding application on the interaction image. Then an icon body 4010 may be overlappingly displayed on the basic icon 400. The icon body 4010 may be transparently formed so as to keep the basic icon 4000 visible therethrough, and may have different sizes depending on the progress of downloading. Referring to FIG. 40, the icon body 4010 may be expressed as being gradually growing from the bottom of the basic icon 4000 into a soft hexahedron cube object, but not limited thereto. By way of example, the basic icon 4000 may be expressed as a bar graph or circular graph which varies on one side depending on the progress of downloading. Alternatively, the background color of the basic icon 4000 may gradually change according to the progress of downloading.

FIG. 48 illustrates an example of a display method of an icon including a plurality of contents. Referring to FIG. 48, the display apparatus 100 may provide a preview on the interaction screen.

By way of example, if the user touches on the icon 4100 including a plurality of contents therein and moves a point of touch (T) to one direction, the icon 4100 may be elongated in the moving direction, thus showing images 4110-1, 4110-2, 4110-3, 4110-4 representing the contents included in the icon 4100. The icon 4100 may be deformed as if a soft object is deformed in compliance with the direction and magnitude of the user's touch input. Accordingly, without having to click a corresponding icon 4100 to change the content playback screen, the user can check the playable content. The image displayed on the changed icon 4100 may include a capture image of a video content, a title screen, a title, a still image, a thumbnail image of the content, or the like.

As explained above, since the display apparatus according to various exemplary embodiments provides real-life feeling in manipulating the interaction image, the user satisfaction is improved.

Meanwhile, while the operations have been explained so far mainly based on the user's touch input, one will understand that other various types of manipulation such as motion, voice or access may also be implemented.

Further, the display apparatus may be implemented as various types of apparatuses such as TV, mobile phone, PDA, laptop personal computer (PC), tablet PC, PC, smart monitor, electronic frame, electronic book, or MP3 player. In these examples, the size and layout of the interaction image illustrated in the exemplary embodiments explained above may be changed to suit the size, resolution, or aspect ratio of the display unit provided in the display apparatus.

Further, the methods of the exemplary embodiments may be implemented as a program and recorded on a non-transitory computer readable medium to be used, or implemented as a firmware. By way of example, when a non-transitory computer readable medium loaded with the above-mentioned application is mounted on the display apparatus, the display apparatus may implement the display method according to the various exemplary embodiments explained above.

To be specific, the non-transitory computer readable medium storing therein a program to implement the operations of displaying an interaction image including at least one object, detecting a touch input with respect to the interaction image, and changing a display status of the interaction image to express physical interaction of the at least one object in response to the touch input, may be provided. The types and configurations of the interaction image, and examples of the physical interaction expressed on the image may be varied depending on exemplary embodiments.

The non-transitory computer readable medium may semi-permanently store the data, rather than storing the data for a short period of time such as register, cache, or memory, and is readable by a device. To be specific, the various applications or programs mentioned above may be stored on the non-transitory computer readable medium such as compact disc (CD), digital versatile disc (DVD), hard disk, Blu-ray disk, universal serial bus (USB), memory card or read only memory (ROM) to be provided.

Accordingly, even a general display apparatus provided with a graphic card of the like may implement the various types of display methods explained above as the above-mentioned program or firmware is loaded.

The foregoing embodiments are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display method of an apparatus, comprising:
    displaying a plurality of areas on a screen;
    detecting a touch manipulation of a user; and
    adjusting a size of the plurality of areas according to the touch manipulation,
    wherein the adjusting comprises reducing a size of an area which is located in a direction with reference to a point where the touch manipulation is detected from among the plurality of areas and expanding a size of an area which is located in another direction.

2. The display method of claim 1, wherein the reducing and expanding occurs substantially simultaneously.

3. The display method of claim 1, wherein when the touch manipulation ends, the plurality of areas return to their original size.

4. The display method of claim 3, wherein a velocity of recovery of the plurality of areas to their original size is based on an intensity of pressure of the touch manipulation.

5. The display method of claim 1, further comprising:
if the touch manipulation is made at a last page, initiating at least an oscillation effect on the screen.

6. The display method of claim 1, further comprising adjusting at least one from among a shape, a size, and a boundary of only areas substantially close in proximity to where the touch manipulation occurs.

7. The display method of claim 1, wherein the touch manipulation includes a drag and touch input.

8. A display method of a display apparatus, comprising:
displaying a plurality of areas on a screen;
detecting a touch manipulation on the screen;
adjusting a size of the plurality of areas according to the touch manipulation; and
determining a size of an area affected by the touch manipulation based on an intensity of pressure of the touch manipulation,
wherein the adjusting comprises reducing a size of an area which is located in a direction with reference to a point where the touch manipulation is detected from among the plurality of areas and expanding a size of an area which is located in another direction.

9. The display method of claim 8, wherein the size of the area which is located in said another direction gets larger as the intensity of the touch manipulation increases.

10. A display apparatus, comprising:
a display configured to display a plurality of areas on a screen;
a detector configured to detect a touch manipulation of a user; and
a controller which, if the touch manipulation is detected, is configured to reduce a size of at least one of the plurality of areas in a direction with reference to a point where the touch manipulation is detected from among the plurality of areas and expand a size of an area which is located in another direction.

11. The display apparatus of claim 10, wherein the reduction and expansion occurs substantially simultaneously.

12. A display apparatus, comprising:
a display configured to display a plurality of areas on a screen;
a detector configured to detect a touch manipulation of a user; and
a controller which, if the touch manipulation is detected, is configured to adjust at least one from among a shape, a size, and a boundary of only areas in close proximity to where the touch manipulation occurs,
wherein the adjusting the size comprises reducing a size of an area which is located in a direction with reference to a point where the touch manipulation is detected from among the plurality of areas and expanding a size of an area which is located in another direction.

13. A display apparatus, comprising:
a display configured to display a plurality of areas on a screen;
a detector configured to detect a touch manipulation on the screen; and
adjusting a size of the plurality of at least one of the plurality of areas according to the touch manipulation,
wherein the adjusting comprises reducing a size of an area which is located in a direction with reference to a point where the touch manipulation is detected from among the plurality of areas and expanding a size of an area which is located in another direction, and
wherein a size of an area affected by the touch manipulation is determined by an intensity of pressure of the touch manipulation.

* * * * *